(12) United States Patent
Nakazawa et al.

(10) Patent No.: US 8,173,281 B2
(45) Date of Patent: May 8, 2012

(54) CERAMIC SINTER, MAGNETIC HEAD SUBSTRATE USING THE SAME, MAGNETIC HEAD AND RECORDING MEDIUM DRIVE UNIT

(75) Inventors: Shuji Nakazawa, Kirishima (JP);
Yucong Wang, Kirishima (JP);
Masahide Akiyama, Kirishima (JP);
Takuya Gentsu, Higashiomi (JP);
Toshiyuki Sue, Kirishima (JP)

(73) Assignee: Kyocera Corporation, Kyoto (JP)

( * ) Notice: Subject to any disclaimer, the term of this patent is extended or adjusted under 35 U.S.C. 154(b) by 328 days.

(21) Appl. No.: 12/513,457

(22) PCT Filed: Nov. 7, 2007

(86) PCT No.: PCT/JP2007/071653
§ 371 (c)(1),
(2), (4) Date: Sep. 10, 2009

(87) PCT Pub. No.: WO2008/056710
PCT Pub. Date: May 15, 2008

(65) Prior Publication Data
US 2010/0061013 A1    Mar. 11, 2010

(30) Foreign Application Priority Data
Nov. 7, 2006   (JP) ................................. 2006-301100

(51) Int. Cl.
*G11B 5/127* (2006.01)
*C04B 35/117* (2006.01)
*C04B 35/56* (2006.01)

(52) U.S. Cl. ....... 428/813; 501/87; 501/127; 360/235.1; 360/235.3

(58) Field of Classification Search .................... 501/87, 501/127; 428/813; 360/235.1, 235.3
See application file for complete search history.

(56) References Cited

U.S. PATENT DOCUMENTS

| 7,381,670 B2 * | 6/2008 | Sugiura et al. ................... 501/87 |
| 2005/0288171 A1 | 12/2005 | Ujita et al. ..................... 501/127 |
| 2006/0293166 A1 * | 12/2006 | Sugiura et al. ................. 501/127 |

FOREIGN PATENT DOCUMENTS

| JP | 02-229757 | 9/1990 |
| JP | 05-194022 | 8/1993 |
| JP | 2000-103667 | 4/2000 |
| JP | 2000103667 | * 4/2000 |
| JP | 2005336034 | * 12/2005 |
| JP | 2006-010058 | 1/2006 |
| JP | 2006-248803 | 9/2006 |

OTHER PUBLICATIONS

Machine translation JP 2006248803 Sep. 2006.*

* cited by examiner

*Primary Examiner* — Karl Group
(74) *Attorney, Agent, or Firm* — DLA Piper LLP (US)

(57) ABSTRACT

A ceramic sintered body contains $Al_2O_3$ crystal grains, internal TiC crystal grains existing in the $Al_2O_3$ crystal grains and external TiC crystal grains other than the internal TiC crystal grains. The $Al_2O_3$ crystal grains and the external TiC crystal grains retain stress caused by the difference in thermal expansion coefficient remaining after sintering, so that the $Al_2O_3$ crystal grains and the external TiC crystal grains pull each other in the interface therebetween. As a result, when the ceramic sintered body is machined, micro-cracks generated in the interface can easily grow due to the residual stress in addition to the shearing force caused by the machining operation, so that machinability is improved.

16 Claims, 10 Drawing Sheets

CERAMIC SINTER, MAGNETIC HEAD SUBSTRATE USING THE SAME, MAGNETIC HEAD AND RECORDING MEDIUM DRIVE UNIT

CROSS-REFERENCE TO THE RELATED APPLICATIONS

This application is a national stage of international application No. PCT/JP2007/071653 filed on Nov. 7, 2007, which also claims the benefit of priority under 35 USC 119 to Japanese Patent Application No. 2006-301100 filed on Nov. 7, 2006, the entire contents of which are incorporated herein by reference.

TECHNICAL FIELD

The present invention relates to a ceramic sintered body used as the base material of a slider that constitutes a magnetic head such as magnetoresistance (MR) head, giant magnetoresistance (GMR) head, tunneling magnetoresistance effect (TMR) head or anisotropic magnetoresistance (AMR) head used in a recording medium drive unit or used as a fixture for machining such a magnetic head, a magnetic head substrate using the same, a magnetic head and a recording medium drive unit.

BACKGROUND ART

Density of information recorded on a magnetic recording medium has been increasing at a remarkable pace in recent years. It is a common practice to use a magnetic head for recording and reproducing information, the magnetic head having a slider that runs while being lifted over a recording medium, the slider being provided with an electromagnetic converter element.

The slider used in the magnetic head is required to be high in machinability and in wear resistance, and its surface which opposes the recording medium and experiences a force by air when the slider is floating in air is required to be very smooth. The slider is manufactured, for example, in the following procedure.

An insulating film made from amorphous alumina is formed by sputtering process on a ceramic substrate made from $Al_2O_3$—TiC ceramics or the like. A plurality of electromagnetic converter elements such as MR (magnetoresistance) element (hereinafter referred to as an MR element), GMR (giant magnetoresistance) element (hereinafter referred to as a GMR element), TMR (tunneling magnetoresistance) element (hereinafter referred to as a TMR element) or AMR (anisotropic magnetoresistance) element (hereinafter referred to as an AMR element), that uses magnetoresistance effect are mounted in a row at desired intervals on the insulating film.

The ceramic substrate bearing the plurality of electromagnetic converter elements disposed in a row is cut into rectangles by means of a slicing machine or a dicing saw. After polishing the cut surfaces of the rectangular ceramic substrate to be mirror-finished surfaces, part of the mirror-finished surface is removed by ion milling process or reactive ion etching process to thereby form a flow passage, while using the remaining mirror-finished surface as the floating surface. Then the rectangular ceramic substrate is divided into chips, so as to obtain the magnetic head having the slider provided with the electromagnetic converter elements.

The slider has, on the surface opposing the recording medium comprising a magnetic recording layer, the floating surface mirror-finished by polishing and the flow passage formed by removing a part of the mirror-finished surface, so that information is recorded and reproduced by the magnetic head lifted by a force generated by the recording medium rotating at a high speed not to touch the recording medium.

The recording medium drive unit (hard disk drive unit) having such a magnetic head as described above mounted therein is under ever increasing demand to have greater recording capacity with higher recording density. To meet these requirements, the magnetic head must be kept at a height as low as 10 nm or less above the hard disk. However, clearance of 10 nm or less between the hard disk rotating at a high speed and the magnetic head increases the possibility of the hard disk and the magnetic head touching each other due to vibration and impact, causing crystal grains of the compound that forms the slider constituting the magnetic head to come off (hereinafter referred to as grain fall-off), which may damage the hard disk and/or the magnetic disk and make it impossible to record and reproduce information. Crystal grains may also come off from the cut surface of the magnetic head substrate being divided into rectangular pieces and chips, or from the portion where the flow passage is formed by the ion milling process or reactive ion etching process, which may also cause the same trouble when falling onto the hard disk rotating at a high speed.

Accordingly, it is required to use a material that does not allow the crystal grains of the constituting compound to easily come off, for the magnetic head substrate used in forming the slider that constitutes the magnetic head, and it is necessary to improve the bonding between the crystal grains, namely to improve the sintering characteristic.

To meet these requirements, Patent Document 1 proposes $Al_2O_3$—TiC-based sintered body comprising 50 to 75% by weight of $Al_2O_3$ and 25 to 50% by weight of TiC as main components, and contains 0.03 to 0.5 parts by weight of sintering additive based on 100 parts by weight of the main components, wherein a mean crystal grain size in the sintered body is from 0.4 to 1.2 μm and standard deviation of the diameters of equivalent circles of the crystal grains is 0.35 or less. It is described that this sintered body has improved chipping resistance and high fracture toughness.

Patent Document 2 proposes a ceramic composite material containing fine TiC grains having a grain size of 2.0 μm or less, dispersed among crystal grains of $Al_2O_3$ matrix having a grain size of 0.5 μm to 100 μm.

Patent Document 1: Japanese Unexamined Patent Publication (Kokai) No. 2000-103667
Patent Document 2: Japanese Patent No. 2,664,760

DISCLOSURE OF THE INVENTION

Problems to be Solved by the Invention

The $Al_2O_3$—TiC-based sintered body proposed in Patent Document 1 improves chipping resistance. However it has high fracture toughness, thus resulting in low efficiency of polishing operation when the sintered body is lapped. As a result, satisfactorily smooth surface cannot be obtained, thus making it impossible to make a magnetic head that can be used at a low floating height.

The compound ceramic material proposed in Patent Document 2 has high strength. However, as it aims at improving the fracture toughness by dispersing fine TiC grains among crystal grains of $Al_2O_3$ matrix, it has high fracture toughness similarly to the case of Patent Document 1, resulting in low efficiency of polishing operation when the sintered body is lapped, thus making it difficult to machine.

Particularly as there is growing demand to increase the recording density in magnetic recording devices in recent years, emphasis is being placed on smoothness of the floating surface for the magnetic heads that are used at a height of 10 nm or less above the recording medium. To obtain a smooth floating surface, it must be polished with diamond abrasive having a mean particle size of 0.1 μm or less. When the magnetic head substrate made from the $Al_2O_3$—TiC-based sintered body or the compound ceramic material proposed in Patent Document 1 or 2, respectively, is polished by using diamond abrasive having a mean particle size of 0.1 μm or less, good machinability cannot be obtained, and it is impossible to use the magnetic heads made from this sintered body, at a height of 10 nm or less above the recording medium.

Also the floating surface of the magnetic head has not been sufficiently smooth.

The present invention has been contrived to solve the problems described above, and its object is to provide a ceramic sintered body having high machinability as well as an effectively-maintained electrical conductivity, a magnetic head substrate using the same, a magnetic head and a recording medium drive unit.

Means for Solving the Problems

A ceramic sintered body according to the present invention comprises: $Al_2O_3$ crystal grains; internal TiC crystal grains existing in the $Al_2O_3$ crystal grains; and external TiC crystal grains other than the internal TiC crystal grains.

The ceramic sintered body according to the present invention is characterized in that most of the external TiC crystal grains exist in contact with the $Al_2O_3$ crystal grains.

The ceramic sintered body according to the present invention is characterized in that a proportion of an area of the external TiC crystal grains to an area of the total TiC crystal grains in sectional view is not less than 80% nor more than 99.7%.

The ceramic sintered body according to the present invention is characterized in a content of TiC therein is not less than 36% by weight nor more than 50% by weight.

The ceramic sintered body according to the present invention is characterized in that the mean crystal grain size of the $Al_2O_3$ crystal grains is 1.5 μm or less, and the mean crystal grain size of the external TiC crystal grains is 0.6 μm or less.

The ceramic sintered body according to the present invention is characterized in that a proportion of the mean crystal grain size of the external TiC crystal grains to the mean crystal grain size of the $Al_2O_3$ crystal grains is not less than 45% nor more than 95%.

The ceramic sintered body according to the present invention is characterized in that it has heat conductivity of 21 W/(m·K) or higher.

The magnetic head substrate according to the present invention is characterized in that it is made of the ceramic sintered body.

The magnetic head substrate according to the present invention is characterized in that a difference between a lattice constant of TiC at either principal surface and a lattice constant of TiC at the central portion in the direction of thickness is $1 \times 10^{-4}$ nm or less.

The magnetic head substrate according to the present invention is characterized in that a lattice constant of TiC at either principal surface and a lattice constant of TiC at the center in the direction of thickness of the magnetic head substrate are not less than 0.43150 nm nor more than 0.43168 nm.

The magnetic head substrate according to the present invention is characterized in that a content of $Al_2O_3$ is not less than 60% by weight nor more than 65% by weight, and a content of TiC is not less than 35% by weight nor more than 40% by weight.

The magnetic head substrate according to the present invention is characterized in that it has a breakage strength of 700 MPa or higher.

The magnetic head substrate according to the present invention is characterized in that a difference between a density at either the principal surface and a density at the central portion in the direction of thickness of the magnetic head substrate is 0.004 g/cm³ or less.

The magnetic head substrate according to the present invention is characterized in that a density of the magnetic head substrate is 4.326 g/cm³ or higher.

The magnetic head according to the present invention is characterized in that an electromagnetic converter element is provided on each slider formed by dividing the magnetic head substrate into chips.

The magnetic head according to the present invention is characterized in that the slider has a floating surface and a flow passage surface where air is allowed to flow, and arithmetic mean height (Ra) of the flow passage surface is 25 nm or less.

The recording medium drive unit according to the present invention comprises: the magnetic head; a recording medium having a magnetic recording layer for recording and reproducing information by means of the magnetic head; and a motor for driving the recording medium.

Effects of the Invention

The ceramic sintered body according to the present invention contains $Al_2O_3$ crystal grains, internal TiC crystal grains existing in the $Al_2O_3$ crystal grains and external TiC crystal grains other than the internal TiC crystal grains, and therefore the $Al_2O_3$ crystal grains and the external TiC crystal grains retain stress caused by the difference in thermal expansion coefficient remaining after sintering, so that the $Al_2O_3$ crystal grains and the external TiC crystal grains pull each other in the interface therebetween. As a result, when the ceramic sintered body is machined, micro-cracks generated in the interface can easily grow due to the residual stress in addition to the shearing force caused by the machining operation, so that the material can be easily machined.

In the ceramic sintered body according to the present invention, the external TiC crystal grains are in contact mainly with the $Al_2O_3$ crystal grains and therefore more interface is formed where the external TiC crystal grains and the $Al_2O_3$ crystal grains make contact with each other than in a case where the external. TIC crystal grains bond with each other or aggregate. As a result, when the ceramic sintered body is machined, micro-cracks generated in the interface can easily grow due to the residual stress in addition to the shearing force caused by the machining operation, so that the material can be more easily machined.

In the ceramic sintered body according to the present invention, proportion of the area of the external TiC crystal grains to the area of the total TiC crystal grains in sectional view is not less than 80% nor more less than 99.7%. Therefore, the external TiC crystal grains act to bind the $Al_2O_3$ crystal grains with each other so as to maintain the mechanical strength when the shearing force is not applied. When the crystal grains are subjected to the shearing force, microcracks can be more easily generated in the external TiC crystal grains and the $Al_2O_3$ crystal grains, so that the material can be more easily machined.

The ceramic sintered body according to the present invention contains TiC in concentration in a range not less than 36% by weight nor more than 50% by weight. As a result, using this sintered body as the magnetic head substrate makes it possible to remove electrostatic charge quickly, since TiC is included in a proper range of concentration, which has high electrical conductivity.

The ceramic sintered body according to the present invention contains the $Al_2O_3$ crystal grains whose mean crystal grain size is 1.5 μm or less and the external TiC crystal grains whose mean crystal grain size is 0.6 μm or less. As a result, it becomes difficult for the TiC crystal grains to exist in the $Al_2O_3$ crystal grains, and fracture toughness is suppressed from increasing excessively, so that the ceramic sintered body of satisfactory machinability can be obtained. Also the TiC particles having high electrical conductivity causes electric discharge on the surface of the ceramic sintered body and makes the ceramic sintered body having high electrical conductivity.

In the ceramic sintered body according to the present invention, the proportion of the mean crystal grain size of the external TiC crystal grains to the mean crystal grain size of the $Al_2O_3$ crystal grains is in a range not less than 45% nor more than 95%. Therefore, in case the magnetic head is made from this ceramic sinter, forming the flow passage by using the reactive ion etching process makes it possible to decrease the difference in height, caused by the difference in reactivity between the $Al_2O_3$ crystal grains and the TiC crystal grains, so that the magnetic head of stable floated posture can be obtained.

Also the ceramic sintered body according to the present invention has heat conductivity of 21 W/(m·K) or higher, and therefore the heat generated by the shearing force of polishing operation can be dissipated through the ceramic sintered body to the polishing fixture and the lapping machine, so that significant grain fall-off due to seizure with the lapping machine can be prevented from occurring.

In particular, the magnetic head substrate according to the present invention is made from the ceramic sintered body having both high electrical conductivity and high machinability, particularly satisfactory machinability on polishing, as described above, and therefore preferable performance is achieved.

Also in the magnetic head substrate according to the present invention, in case the difference between a lattice constant of TiC at either principal surface and a lattice constant of TiC at the central portion in the direction of thickness of the magnetic head substrate is $1 \times 10^{-4}$ nm or less, most of $TiO_2$ added as the sintering additive turns into TiC, so that fine pores measuring 100 nm to 500 nm in diameter, generated by the formation of solid solution of TiO into the TiC crystal grains, are reduced. As a result, it is made possible to decrease the variation in surface roughness of the flow passage obtained by removing a part of the mirror-finished surface by the ion milling process or the reactive ion etching process after cutting the magnetic head substrate into rectangles and polishing the cut surface into mirror surface.

Also in the magnetic head substrate according to the present invention, in case the lattice constant of TiC is 0.43150 nm or more in the principal surfaces and the central portion in the direction of thickness of the magnetic head substrate, the formation of a solid solution of TiO into the TiC crystal grains can be suppressed further so that fine pores measuring 100 nm to 500 nm in diameter can be decreased as described above. This makes it possible to decrease the variation in surface roughness of the flow passage. Also because the lattice constant of TiC is not greater than 0.43168 nm, the amount of TiC that forms solid solution in the TiC crystal grains falls within an optimum range. As a result, the magnetic head substrate having stable mechanical characteristic and stable thermal characteristic can be obtained as the crystal structure becomes more homogeneous without compromising the sintering characteristic.

The magnetic head substrate according to the present invention contains $Al_2O_3$ in a range not less than 60% by weight nor more than 65% by weight, and TiC in a range not less than 35% by weight nor more than 40% by weight, and is therefore capable of maintaining well-balanced electrical conductivity and machinability.

Also in the magnetic head substrate according to the present invention, as the breakage strength is 700 MPa or higher, generation of micro-cracks is suppressed when the magnetic head substrate is divided into chips to obtain the slider. As a result, grain come-off due to the micro-cracks is less likely to occur, and satisfactory CSS (contact-start-stop) characteristic is obtained.

In the magnetic head substrate according to the present invention, since the difference between a density of the magnetic head substrate at either principal surface and a density of the magnetic head substrate at the center in the direction of thickness is set to 0.004 g/cm$^3$ or less, most of $TiO_2$ added as the sintering additive turns into TiC crystal grains, so that fine pores measuring 100 nm to 500 nm in diameter generated by the formation of solid solution of TiO into the TiC crystal grains are reduced. Therefore, localized concentration of pores can be prevented from occurring throughout the entire magnetic head substrate, and oxygen is substantially uniformly distributed in the TiC crystal grains, so that it is made possible to decrease the variation in surface roughness of the flow passage surface obtained by removing a part of the mirror-finished surface by the ion milling process or the reactive ion etching process. As a result, the magnetic head of stable floating characteristic can be obtained, by forming the magnetic head from this substrate because of high homogeneity thereof.

As density of the magnetic head substrate according to the present invention is set to 4.326 g/cm$^3$ or higher, formation of solid solution of TiO into the TiC crystal grains can be suppressed further so that fine pores measuring 100 nm to 500 nm in diameter can be decreased as described above. This makes it possible to decrease the variation in surface roughness of the flow passage.

The magnetic head according to the present invention has the electromagnetic converter element provided on each of the sliders formed by dividing the magnetic head substrate into chips, and therefore there is no possibility of significant grain fall-off from the individual sliders that have been cut off, thus providing preferable slider of small size such as femto-slider and ato-slider.

In the magnetic head according to the present invention, each slider has a floating surface and a flow passage surface where air is allowed to flow, and the flow passage surface has arithmetic mean height (Ra) of 25 nm or less. As a result, the difference in height caused by the difference in reactivity between the $Al_2O_3$ crystal grains and the TiC crystal grains is decreased, so that the floated posture is stabilized.

The recording medium drive unit according to the present invention comprises the magnetic head, the recording medium having the magnetic recording layer for recording and reproducing information by means of the magnetic head, and the motor for driving the recording medium, and therefore even the slider of small size has the floating surface of high accuracy. As a result, the floating height can be maintained constant and correct recording and reproduction of information can be ensured over a long period of time.

DESCRIPTION OF REFERENCE NUMERALS

Figure 1A:
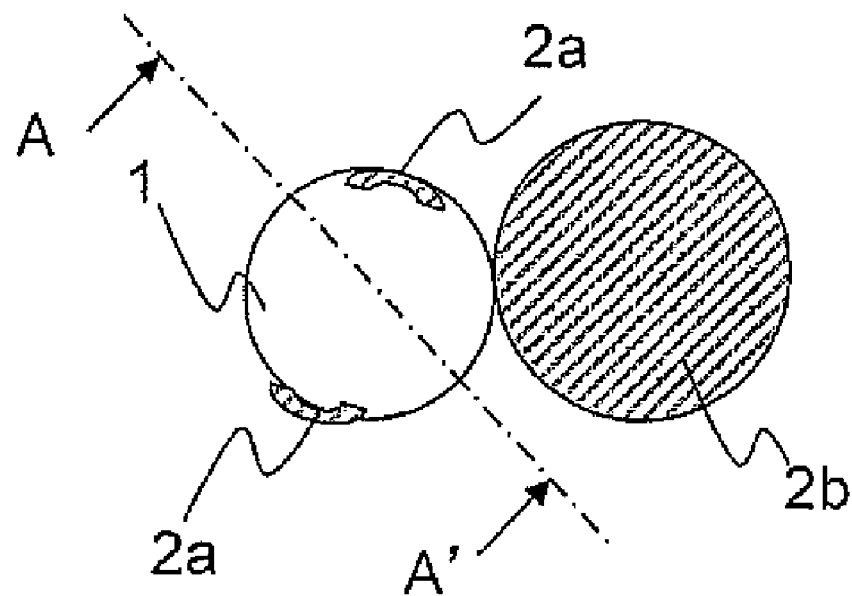
FIG. 1 is a schematic diagram showing the structure of the ceramic sintered body according to the present invention, (a) being a schematic diagram showing the minimum unit of the structure and (b) being a sectional view taken along lines A-A' in (a).

1: $Al_2O_3$ crystal grains
2a, 2b: External TiC crystal grains
3a to 3d: Internal TiC crystal grains
10: Magnetic head substrate
20: Magnetic head
21: Slider
21a: Floating surface
21b: Flow passage
22: Insulating film
23: Electromagnetic converter element
30: Recording medium drive unit
31: Hard disk
32: Motor
33: Rotary shaft
34: Hub
35: Spacer
36: Clamp
37: Screw
38: Chassis
39: Carriage
40: Suspension
44: Lapping apparatus
45: Lapping table
46: Polishing liquid
47: Container
48: Lapping fixture
49: Ceramic sinter

MODE FOR CARRYING OUT THE INVENTION

Preferred embodiment according to the present invention will be described below.

Figure 1B:
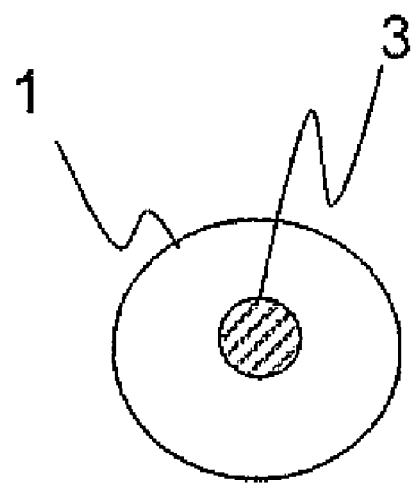

FIG. 1 is a schematic diagram showing the structure of the ceramic sintered body according to the present invention, (a) being a schematic diagram showing the minimum unit of the structure and (b) being a sectional view taken along lines A-A' in (a). FIG. 1(a) shows the crystal structure consisting of external TiC crystal grains 2a, that are part of the TiC crystal grains which are products of reducing reaction of the $TiO_2$ powder used as the raw material and exist in contact with the $Al_2O_3$ crystal grains 1, and external TiC crystal grains 2b that are part of the TiC crystal grains taken into the TiC powder and exist outside of the $Al_2O_3$ crystal grains 1. FIG. 1(b) shows part of the TiC crystal grains existing as the internal TiC crystal grains 3 in the $Al_2O_3$ crystal grains 1.

The ceramic sintered body (hereinafter referred to simply as a sintered body) according to the present invention is $Al_2O_3$—TiC ceramics that contains $Al_2O_3$ and TiC, and it is important that the ceramic sintered body contains $Al_2O_3$ crystal grains, internal TiC crystal grains existing in the $Al_2O_3$ crystal grains and external TiC crystal grains other than the internal TiC crystal grains, as shown in FIG. 1.

The $Al_2O_3$ crystal grains and the external TiC crystal grains retain stress caused by the difference in thermal expansion coefficient remaining after sintering, so that the $Al_2O_3$ crystal grains and the external TiC crystal grains pull each other in the interface therebetween. As a result, when the sintered body is polished by using fine diamond abrasive or the sintered body is cut off by using a slicing machine or dicing saw, micro-cracks generated in the crystal grains can easily grow due to the residual stress in addition to the shearing force caused by the machining operation such as polishing and cutting, so that machinability of the material can be improved.

In case the external TiC crystal grains 2a, 2b exist in contact mainly with the $Al_2O_3$ crystal grains 1, in particular, because of the residual stress caused by the difference in thermal expansion coefficient between the external TiC crystal grains 2a, 2b and the $Al_2O_3$ crystal grains 1, the $Al_2O_3$ crystal grains and the external TiC crystal grains pull each other in the interface without any other material disposed therebetween. Thus when the shearing force caused by the machining operation is applied to the external TiC crystal grains 2a, 2b and the $Al_2O_3$ crystal grains 1, micro-cracks generated in the interface can easily grow, so that the material can be more easily machined. FIG. 1(a) shows a state where both the external TiC crystal grains 2a, 2b exist in contact with the $Al_2O_3$ crystal grains 1.

The expression that the external TiC crystal grains make contact mainly with the $Al_2O_3$ crystal grains means that more than 85% of the total number of the external TiC crystal grains, that can be seen in an image of an arbitrarily selected section of the sintered material captured by a scanning electron microscope (SEM) with magnifying power of 13,000 to 20,000 times, make contact with the $Al_2O_3$ crystal grains. Preferably, 92% or more of the total number of the external TiC crystal grains make contact with the $Al_2O_3$ crystal grains.

However, in case one $Al_2O_3$ crystal grain is completely surrounded by a plurality of external TiC crystal grains, dissipation of heat generated by machining operation from the inside of the $Al_2O_3$ crystal grains through the external TiC crystal grains is impeded by the effect of scattering by the external TiC crystal grains, thus resulting in a decrease in the heat conductivity. Therefore, it is preferable that one $Al_2O_3$ crystal grain is interposed by a plurality of external TiC crystal grains on an arbitrary straight line within the image captured by a scanning electron microscope (SEM) (the image will hereinafter referred to as a SEM image).

The state of the external TiC crystal grains $2a$, $2b$ surrounding the $Al_2O_3$ crystal grain 1 can be checked by observing an SEM image with magnifying power of 10,000 to 20,000 times.

The external TiC crystal grains $2a$, $2b$ and the internal TiC crystal grains 3 may have a composition represented by $TiC_xO_y$ (x and y satisfy relationships x+y<1 and x>>y). In this case, it is preferable that x is from 0.85 to 0.9, and y is from 0.1, to 0.15.

Figure 2:
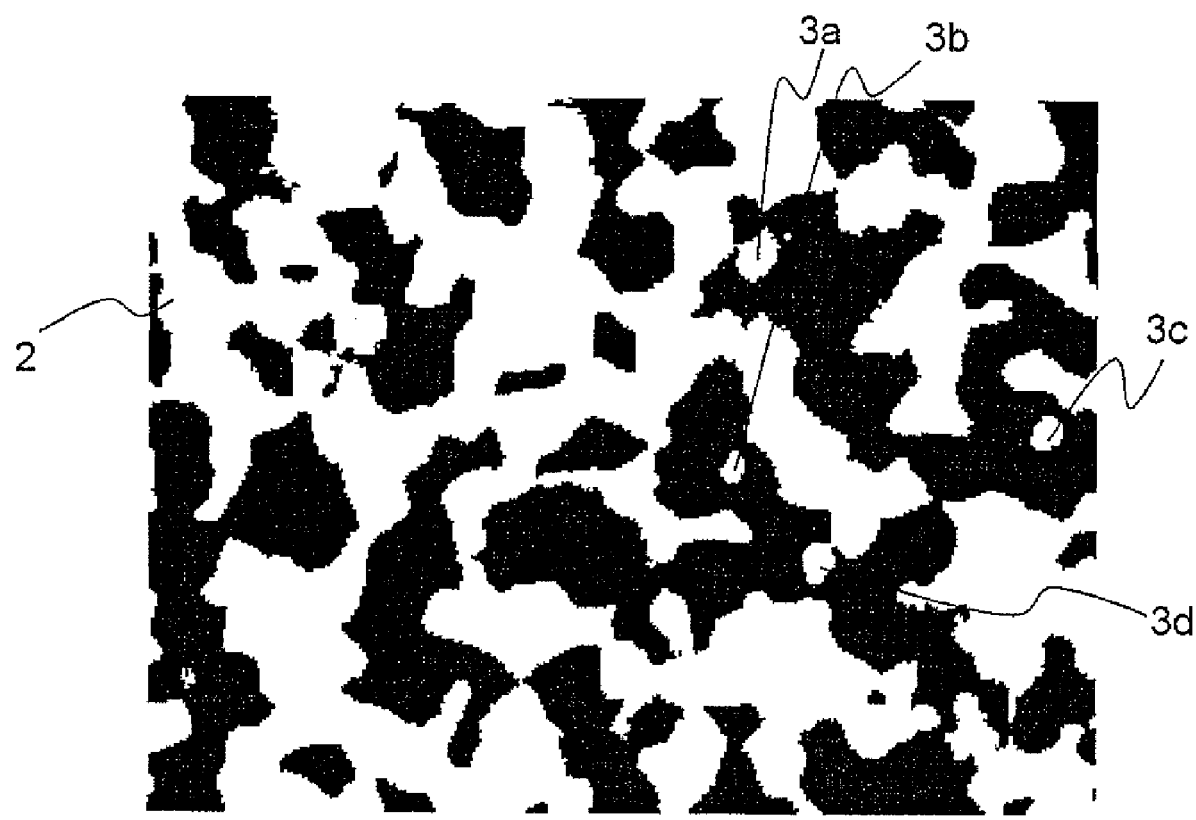
FIG. 2 is a diagram showing an example of image obtained by digitization process for the structure of the ceramic sintered body according to the present invention.

FIG. 2 is a diagram showing an example of image obtained by digitization process for the structure of the sintered material according to the present invention, where black areas represent the $Al_2O_3$ crystal grains and white areas represent TiC crystal grains. White areas denoted as $3a$ to $3d$ represent the internal TiC crystal grains and other white areas denoted as 2 represent the external TiC crystal grains.

Digitization process refers to a process of converting the density of an image to two values of white and black. In this digitization process, the $Al_2O_3$ crystal grains are taken as black, and the TiC crystal grains are taken as white. Composition of each crystal grain can be determined by applying the element analysis to the SEM image by using an X-ray microanalyzer (EPMA).

In case the proportion of the area of the external TiC crystal grains, that have influence on fracture toughness of the sintered body and grain fall-off, to the area of total TiC crystal grains in a sectional view as shown in FIG. 2 is not less than a certain level, proportion of the internal TiC crystal grains becomes lower and therefore a level of fracture toughness enough to maintain satisfactory machinability can be obtained. However, when the proportion of the area of the external TiC crystal grains is too high, fracture toughness of the sintered body decreases and grain fall-off may be caused by machining operation.

For this reason, proportion of the area of the external TiC crystal grains to the area of total TiC crystal grains is preferably in a range not less than 80% nor more than 99.7%, which enables it to maintain satisfactory machinability and proper level of fracture toughness.

In particular, area proportion of the external TiC crystal grains is preferably in a range not less than 85.5% nor more than 95.5%.

Area proportion of the external TiC crystal grains can be determined as follows. First, an arbitrary surface of the sintered material is polished by using diamond abrasive to mirror-finish, and this surface is etched with phosphoric acid for several tens of seconds. An image of a representative portion of the etched surface is captured by a scanning electron microscope (SEM) with a magnifying power of 13,000 times (the image will hereinafter referred to as a SEM image).

The SEM image is processed by, for example, free software named Jtrim.

Specifically, the SEM image is converted to grey scale and, after removing weak noise by means of a filter, contrast of the SEM image is determined. The contrast is corrected by applying equalizer process (a kind of averaging) to the histogram of the contrasts. Then the SEM image is digitized, and total area of the total TiC crystal grains ($S_T$) and the total area of the external TiC crystal grains ($S_{OT}$) are calculated from the image so as to determine the area proportion ($S_{OT}/S_T$).

TiC content in the sintered body is the sum of the content of the internal TiC crystal grains and the content of the external TiC crystal grains, and the TiC content affects the electrical conductivity of the sintered material. Since TiC has a volume specific resistance as low as $1.8 \times 10^{-4}$ Ω·cm, electrostatic charge can be quickly removed. Accordingly, TiC content in the sintered body is preferably in a range not less than 36% by weight nor more than 50% by weight. When the TiC content in the sintered body is less than 36% by weight, the sintered material may not have sufficient level of electrical conductivity depending on the distribution of the TiC crystal grains, thus failing to remove electrostatic charge quickly. When the TiC content in the sintered body is higher than 50% by weight, on the other hand, the material may become difficult to sintered body because Ti has high melting point of 3257° C. Even when the material can be sintered, the sintered material may have poor appearance such as whitened surface. Thus TiC content in the sintered body is preferably in a range not less than 36% by weight nor more than 50% by weight.

TiC content in the sintered body may be measured by ICP (inductively coupled plasma) emission spectroscopic analysis. Specifically, weight of Ti measured by ICP emission spectroscopic analysis is converted to the weight of TiC from which TiC content may be calculated.

Mean crystal grain size of the $Al_2O_3$ crystal grains being included in the sintered body influences the machinability of the material. As the mean crystal grain size of the $Al_2O_3$ crystal grains is getting larger, more TiC crystal grains tend to be taken into the $Al_2O_3$ crystal grains leading to higher fracture toughness and lower machinability. In contrast, when the mean crystal grain size of the $Al_2O_3$ crystal grains is getting smaller, TiC crystal grains tend to exist outside of the $Al_2O_3$ crystal grains, so that fracture toughness does not increase excessively and machinability is improved. Accordingly, in the sintered body according to the present invention, it is preferable to set the mean crystal grain size of the $Al_2O_3$ crystal grains to be 1.5 μm or less, so as to suppress the TiC crystal grains from being taken into the $Al_2O_3$ crystal grains. Decreasing the proportion of the internal TiC crystal grains makes it possible to suppress the fracture toughness from increasing excessively and to make the sintered body having high machinability.

When the content of TiC crystal grains is within a specified range, mean crystal grain size of the external TiC crystal grains also has an influence on the electrical conductivity of the sintered material. This is because, the smaller the mean crystal grain size of the external TIC crystal grains, the better the distributed state of the external TiC crystal grains becomes on the surface of the sinter, thus making electric discharge more likely to occur between adjacent external TiC crystal grains.

In the sintered body according to the present invention, it is preferable to set the mean crystal grain size of the external TiC crystal grains to be 0.6 μm or less. This causes the TiC crystal grains having high electrical conductivity to discharge electricity on the surface of the sintered material, thus increasing the electrical conductivity of the material.

Mean crystal grain sizes of the $Al_2O_3$ crystal grains and the external TiC crystal grains are also measured as follows, similarly to the measurement of area proportion. First, an arbitrary surface of the sintered body is polished by using diamond abrasive to mirror-finish, and this surface is etched with phosphoric acid for several tens of seconds. An image of a representative portion of the etched surface is captured by a scanning electron microscope (SEM) with a magnifying power of 10,000 to 20,000 times (the image will hereinafter referred to as a SEM image).

20 pieces each of the $Al_2O_3$ crystal grains and the external TiC crystal grains are picked from the SEM image. Maximum size across each of the crystal grains is measured, and averaged to determine the mean crystal grain size.

Proportion of mean crystal grain size of the external TiC crystal grains to mean crystal grain size of the $Al_2O_3$ crystal grains (hereinafter referred to as a grain size proportion) influences the machinability and the ease of fine processing that utilizes chemical reaction, such as reactive ion etching process, and is preferably set in a range not less than 45 nor more than 95%. When the proportion is less than 45%, great difference in height between the $Al_2O_3$ crystal grains and the TiC crystal grains is caused, since the TiC crystal grains have higher reactivity than the $Al_2O_3$ crystal grains, in case that the flow passage is formed on the slider by the reactive ion etching process for the magnetic head made of the sinter. As a result, the flow passage has greater surface irregularities, and turbulent flow is generated by the surface irregularities when the magnetic head is floated, thereby causing instability in the floated posture of the magnetic head. When the proportion is higher than 95%, greater residual strain is generated due to the growth of the TiC crystal grains, thus giving rise to the possibility of greater chipping taking place when the magnetic head is made by cutting off the magnetic head substrate into chips.

When the grain size proportion is set in a range not less than 45 nor more than 95%, it is made possible to decrease the difference in height caused by the difference in reactivity between $Al_2O_3$ crystal grains and TiC crystal grains. As a result, turbulent flow is suppressed from being generated when the magnetic head is floated, thereby stabilizing the floated posture of the magnetic head. In addition, residual strain is suppressed from being generated due to the growth of the TiC crystal grains, thus decreasing the chipping taking place when the magnetic head is made by cutting off the magnetic head substrate into chips.

Further, the grain size proportion may be calculated from the mean crystal grain sizes of the $Al_2O_3$ crystal grains and the external TiC crystal grains that have been determined previously.

Heat conductivity of the sintered material has an influence on the machinability, particularly the efficiency of polishing by lapping operation, and must be set to a high level in order to achieve high efficiency.

In particular, in the ceramic sintered body according to the present invention, heat conductivity is preferably 21 W/(m·K) or higher. When heat conductivity is in this range, heat generated by the shearing force of polishing operation can be dissipated through the ceramic sintered body to the lapping fixture and the lapping machine, so that significant grain fall-off due to seizure with the lapping machine can be prevented from occurring.

When the slider is formed via the magnetic head substrate as described below from the sintered material according to the present invention, it is desired that heat conductivity of the slider is higher when heat dissipation of the slider is taken into consideration. Thus heat conductivity of the magnetic head substrate is preferably 21 W/(m·K) or higher. This is because, in case the magnetic head is constituted from electromagnetic converter element such as MR element, GMR element, TMR element or AMR element, floating height of the magnetic head is set to 10 nm or less in order to achieve high recording density, heat generated by the electromagnetic converter element that may affect the information recorded on the hard disk can be quickly dissipated so that the magnetically recorded information is less likely to be destroyed.

Heat conductivity can be measured in accordance to JIS R 1611-1997.

The magnetic head substrate is made from compound sintered body of $Al_2O_3$ and TiC, and $TiO_2$ is used as the sintering additive. $TiO_2$ is reduced to TiO as represented by reaction formula (1), by a small amount of carbon monoxide (CO) contained in the atmosphere of the sintering process. The reduction product TiO forms solid solution in TiC so as to generate $TiC_xO_y$ (x+y<1 and x>>y). The value of x is from 0.85 to 0.9, and y is from 0.1 to 0.15.

$$TiO_2 + CO \rightarrow TiO + CO_2 \qquad (1)$$

In $TiC_xO_y$ that is generated, lattice constant of TiC varies depending on the amount y of solid solution of TiO. Lattice constant takes a maximum value when the amount of solid solution y is 0.15, and decreases as the amount of solid solution y becomes greater or smaller than 0.15, with the difference thereof having an influence on the homogeneity of the crystal phase made from TiC.

According to the present invention, it is preferable that difference between a lattice constant of TiC at either principal surface and a lattice constant of TiC at the center in the direction of thickness of the magnetic head substrate is $1 \times 10^{-4}$ nm or less. When the difference in lattice constant of TiC is in this range, most of $TiO_2$ added as the sintering additive turns into TiC, so that fine pores measuring 100 nm to 500 nm in diameter, generated by the formation of solid solution of TiO into the TiC crystal grains, are reduced. As a result, it is made possible to decrease the variation in surface roughness of the flow passage, obtained by removing a part of the mirror-finished surface, by the ion milling process or the reactive ion etching process after cutting the magnetic head substrate into rectangles and polishing the cut surface into mirror-surface. It is more preferable that the difference between a lattice constant of TiC at either principal surface and a lattice constant of TiC at the center is $2 \times 10^{-5}$ nm or less, so as to further reduce the fine pores and obtain the magnetic head substrate that is substantially free of variation in surface roughness.

According to the present invention, difference between a density of the magnetic head substrate at either principal surface and a density of the magnetic head substrate at the center in the direction of thickness of the magnetic head substrate is 0.004 $g/cm^3$ or less When the difference in density is in this range, most of $TiO_2$ added as the sintering additive turns into TiC, so that fine pores measuring 100 nm to 500 nm in diameter, generated by the formation of solid solution of TiO into the TiC crystal grains, are reduced. As a result, it is made possible to decrease the variation in surface roughness of the flow passage surface obtained by removing a part of the mirror-finished surface by the ion milling process or the reactive ion etching process, because localized concentration of pores can be prevented throughout the entire magnetic head substrate, and oxygen is substantially uniformly distributed in the TiC crystal grains. It is more preferable that difference between a density of TiC at either principal surface and a density of TiC at the central portion in the direction of thickness (hereinafter referred to as a central portion) is 0.002 $g/cm^3$ or less so as to further reduce the fine pores in the magnetic head substrate having the same composition, obtain the magnetic head substrate that is substantially free of variation in surface roughness and improve the mechanical properties such as bending strength.

Oxygen distribution in the TiC crystal grains can be analyzed by Auger electron spectroscopy (AES). For example, Auger electron spectroscopy analyzer (model 1680 manufactured by PHI) may be used by setting the acceleration voltage to 10 kV, current to 10 nA and measuring area to 3 μm by 3 μm.

The positions of the principal surfaces and the central portion of the magnetic head substrate will be described.

Figure 3A:
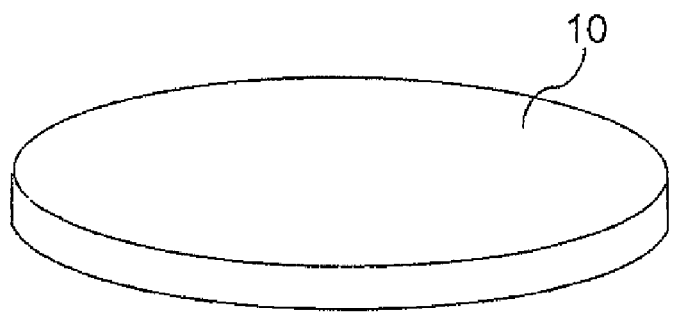
FIG. 3 shows an example of embodiment of the magnetic head substrate according to the present invention, (a) being a perspective view, (b) being a plan view and (c) being a sectional view taken along lines B-B' in (a).
Figure 3B:
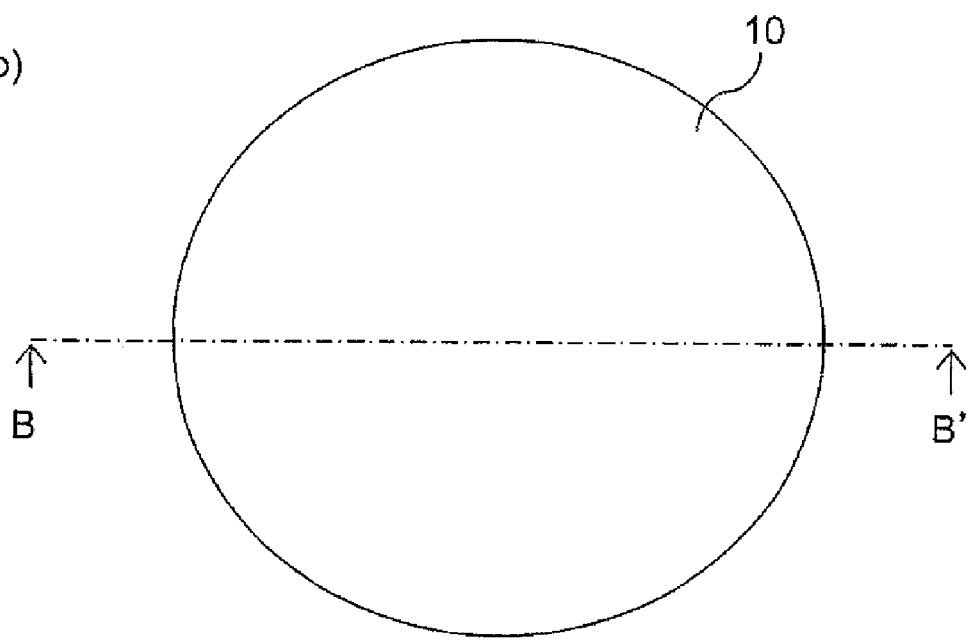
Figure 3C:
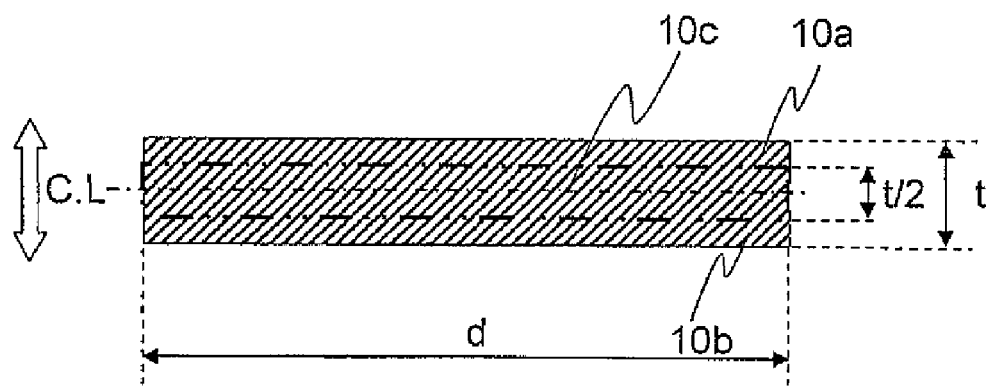

FIG. 3 shows an example of embodiment of the magnetic head substrate according to the present invention, (a) being a perspective view, (b) being a plan view and (c) being a sectional view taken along lines B-B' in (a).

The magnetic head substrate 10 shown in FIG. 3 measures 102 to 153 mm in diameter d and 1.2 to 2 mm in thickness. The principal surfaces of the magnetic head substrate according to the present invention are regions including the upper and lower surfaces of 10a, 10b in FIG. 3, and the central portion 10c is a region (the region surrounded by two dots and dash line) within a range of t/2 from the centerline CL (dot and dash line) of thickness t of the magnetic head substrate, namely the line lying on the center between the two principal surfaces.

Figure 4A:
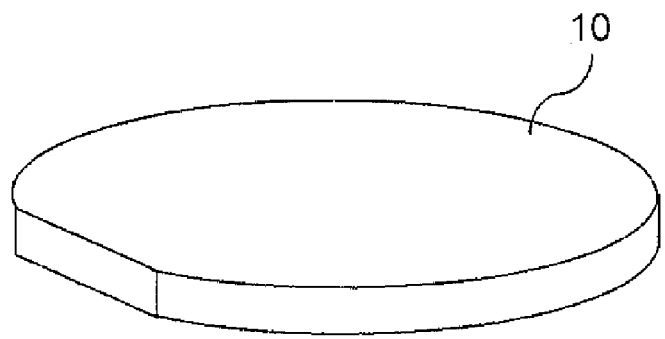
FIG. 4 shows another example of embodiment of the magnetic head substrate according to the present invention, (a) being a perspective view, (b) being a plan view and (c) being a sectional view taken along lines C-C' in (a).
Figure 4B:
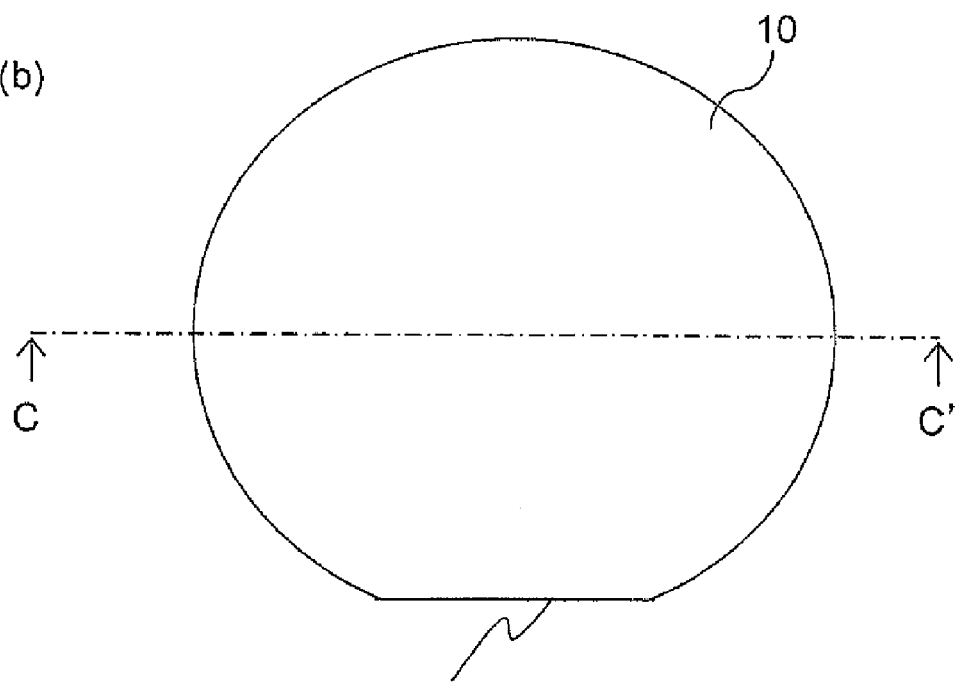
Figure 4C:
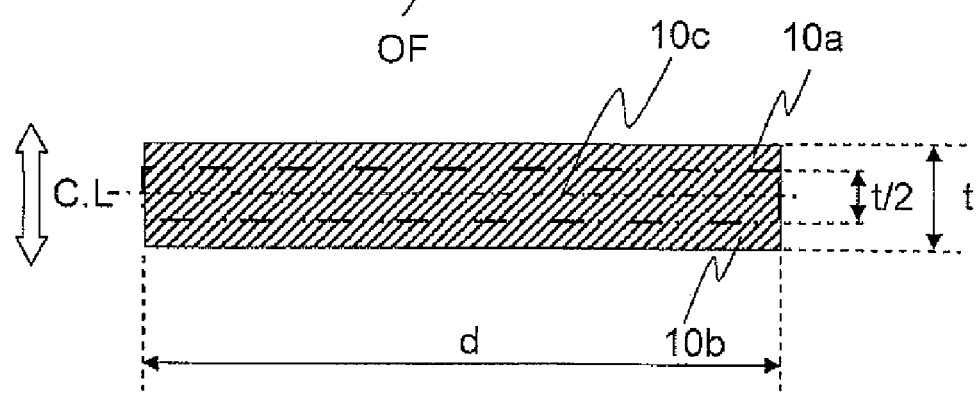

FIG. 4 shows another example of embodiment of the magnetic head substrate according to the present invention, (a) being a perspective view, (b) being a plan view and (c) being a sectional view taken along lines C-C' in (a).

The magnetic head substrate 10 shown in FIG. 4 measures 102 to 153 mm in diameter d and 1.2 to 2 mm in thickness, with a portion thereof being cut straight to form orientation flat OF. The orientation flat OF is used in positioning when mounting the electromagnetic converter element on the slider via an insulation film or cutting the magnetic head substrate 10 in a rectangular shape. The orientation flat OF may be formed by cutting off a portion of the magnetic head substrate 10 shown in FIG. 4 in the direction of thickness by a dicing saw. Similarly to the magnetic head substrate 10 shown in FIG. 3, the principal surfaces of the magnetic head substrate 10 shown in FIG. 4 are regions including the upper and lower surfaces of 10a, 10b in FIG. 3, and the central portion 10c is a region (the region surrounded by two dots and dash line) within a range of t/2 from the centerline CL (dot and dash line) of thickness t of the magnetic head substrate, namely the line lying on the center between the two principal surfaces.

The lattice constant of TiC in principal surfaces 10a, 10b and the central portion 10c of the magnetic head substrate 10 are determined by means of high-resolution X-ray analysis to be described later. Specifically, lattice constant of TiC is measured along the direction of thickness in principal surfaces 10a, 10b and the central portion 10c, and the difference between the lattice constant of TiC of the two principal surfaces on the upper and lower sides and the lattice constant of TiC in the central portion 10c. The lattice constant of TiC in the central portion 10c may be measured on at least one surface of the central portion 10c (one of the surfaces cut from the magnetic head substrate 10).

In the magnetic head substrate 10 according to the present invention, density thereof is influenced by the lattice constant of TiC. When the lattice constant of TiC is too low, carbon dioxide ($CO_2$) generated through reduction of $TiO_2$ in the sintering process is trapped within the magnetic head substrate 10, thus making it easier for fine pores to be generated. In contrast, when the lattice constant of TiC is too high, sintering characteristic becomes lower and pore are likely to be generated.

For these reasons, lattice constant of TiC is preferably in a range not less than 0.43150 nm nor more than 0.43168 nm on the principal surfaces 10a, 10b of the magnetic head substrate 10 and in the central portion 10c. When the lattice constant of TiC is 0.43150 nm or more, formation of solid solution of TiO into the TiC crystal grains can be suppressed so that fine pores measuring 100 nm to 500 nm in diameter can be decreased. This makes it possible to decrease the variation in surface roughness of the flow passage. Also as lattice constant of TiC is not greater than 0.43168 nm, the amount of TiC that forms solid solution in the TiC crystal grains falls within an optimum range. As a result, the magnetic head substrate 10 having stable mechanical characteristic and stable thermal characteristic can be obtained as the crystal structure becomes more homogeneous without compromising the sintering characteristic.

Lattice constant of TiC is more preferably in a range not less than 0.43160 nm nor more than 0.43162 nm, so as to obtain the magnetic head substrate 10 that is substantially free of variation in surface roughness of the flow passage.

Lattice constant of TiC can be determined by means of high-resolution X-ray diffraction analysis. Specifically, the magnetic head substrate 10 is irradiated with characteristic X rays of $CuK_{\alpha 1}$, so as to obtain an X-ray diffraction pattern by scanning over a range of diffraction angle (2θ) of $20° \leq 2\theta \leq 110°$ at steps of 0.008°. The X-ray diffraction pattern is analyzed by Rietvelt method using RIETAN-2000 program (compiled by Fujio Izumi, reference literature: F. Izumi and T. Ikeda; Mater. Sci. Forum, 321-324 (2000) 198), to determine the lattice constant.

When analyzing by Rietvelt method using RIETAN-2000 program as described above, lattice constant varies depending on the peak profile of the diffraction line from the crystal plane of TiC crystal grains. In this case, the peak profile may be constrained by using Toratani's division pseudo-voigt function.

The magnetic head substrate 10 is constituted such that electrostatic charge can be quickly removed by TiC while maintaining the mechanical properties, wear resistance and heat resistance of $Al_2O_3$, and proportion of TiC content in the magnetic head substrate 10 affects the electrical conductivity and machinability. A low proportion of TiC content increases the volume specific resistance resulting in a low electrical conductivity, and a high proportion of TiC content leads to high fracture toughness of the magnetic head substrate 10, thus resulting in lower machinability.

For these reasons, it is more preferable that the magnetic head substrate 10 contains $Al_2O_3$ in a range not less than 60% by weight nor more than 65% by weight, and TiC in a range not less than 35% by weight nor more than 40% by weight. When these components are within these ranges, it is made possible to maintain more well-balanced electrical conductivity and machinability. Proportions of $Al_2O_3$ and TiC in 100% by weight of the elements that constitute the magnetic head substrate (excluding carbon (C) oxygen (O)) may be determined by measuring the proportions of Al and Ti by fluorescence X-ray analysis or ICP (inductively coupled plasma) emission spectroscopic analysis, and converting the Al content to oxide content and Ti content to carbide content.

Volume specific resistance of the magnetic head substrate 10 may be measured in accordance to JIS C 2141-1992, and the measured value is preferably not higher than $1 \times 10^{-3}$ Ω·cm. Machinability of the magnetic head substrate 10 may be evaluated by measuring the amount of material removed by polishing over a unit period of time in lapping operation.

Since a slider of smaller size is subjected to greater influence of breakage strength, the magnetic head substrate 10 according to the present invention preferably has breakage strength of 700 MPa or higher. When the magnetic head substrate 10 has breakage strength of 700 MPa or higher, generation of micro-cracks is suppressed when the magnetic head substrate is divided into chips to obtain the slider. As a result, grain come-off due to the micro-cracks is less likely to occur, and the magnetic head having satisfactory CSS (contact-start-stop) characteristic is obtained, thus providing preferable slider of small size such as femto-slider and ato-slider. Breakage strength can be evaluated by three-point bending strength in accordance to JIS R 1601-1995. In case the magnetic head substrate 10 is very thin and a test piece specified in this JIS standard cannot be cut out of the magnetic head substrate 10, a test piece having the same thickness as that of the magnetic head substrate 10 may be used.

The magnetic head is fabricated from the magnetic head substrate 10 according to the present invention in the following procedure.

An insulation film is formed from amorphous alumina by sputtering on the magnetic head substrate 10, and an electromagnetic converter element such as MR element, GMR element, TMR element or AMR element that utilizes the magnetoresistance is mounted on the insulation film.

Then the magnetic head substrate 10 having the electromagnetic converter element mounted thereon is cut into rectangles by means of a slicing machine or a dicing saw. After polishing the surface of the rectangular magnetic head substrate 10 that is parallel to the direction of thickness (the direction indicated by white arrow in FIGS. 3 and 4) to mirror-finish, part of the mirror-finished surface is removed by the ion milling process or the reactive ion etching process thereby to form a flow passage, while using the remaining mirror-finished surface as the floating surface. Then the magnetic head substrate 10 that has been cut in rectangular shape is divided into chips, so as to obtain the magnetic head.

Figure 5:
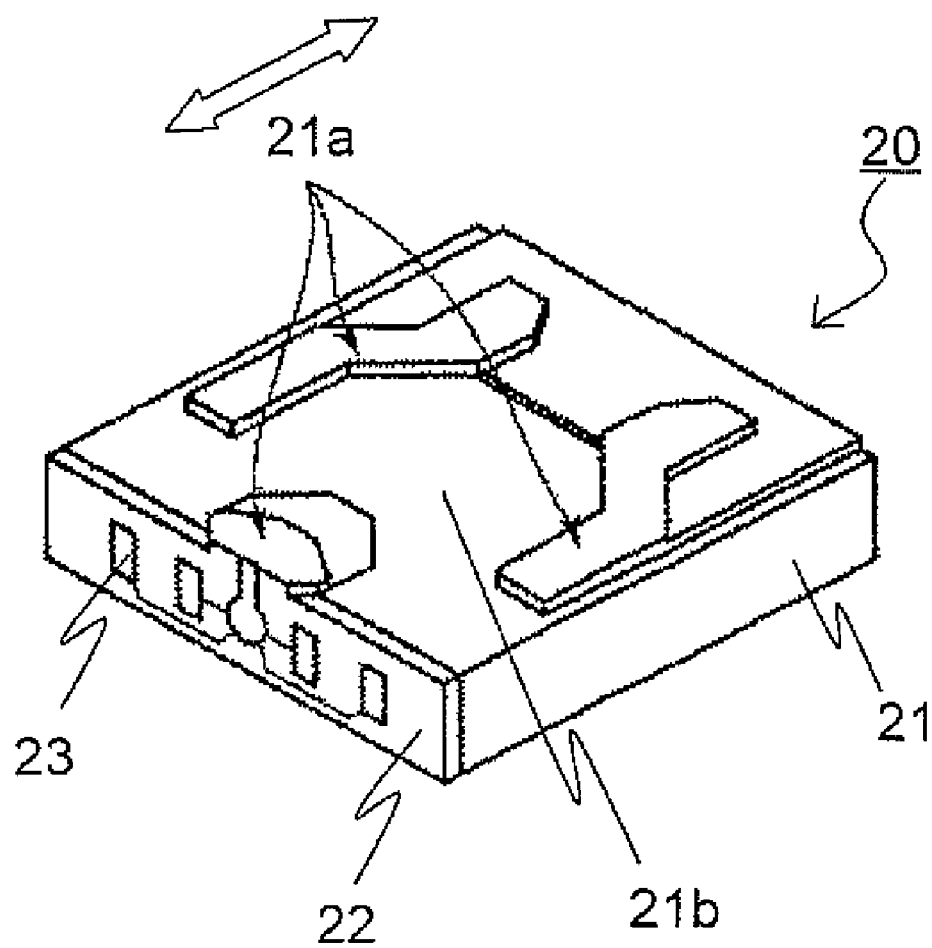
FIG. 5 is a perspective view showing an example of embodiment of the magnetic head according to the present invention.

FIG. 5 is a perspective view showing an example of embodiment of the magnetic head according to the present invention.

The magnetic head 20 according to the present invention comprises the slider 21 having the floating surface 21a and the flow passage 21b that allows air to flow, and the electromagnetic converter element 23 mounted on the slider 21 via the insulation film 22. The floating surface 21a opposes the hard disk (not shown) that is a recording medium having a magnetic recording layer for recording and reproducing information and is lifted at a height of, for example, 10 nm or less. The flow passage 21b opposes the hard disk and functions as a flow passage that allows air to flow for lifting the magnetic head 20. Depth of the flow passage 21b is, for example, 1.5 to 2.5 μm.

Figure 6A:
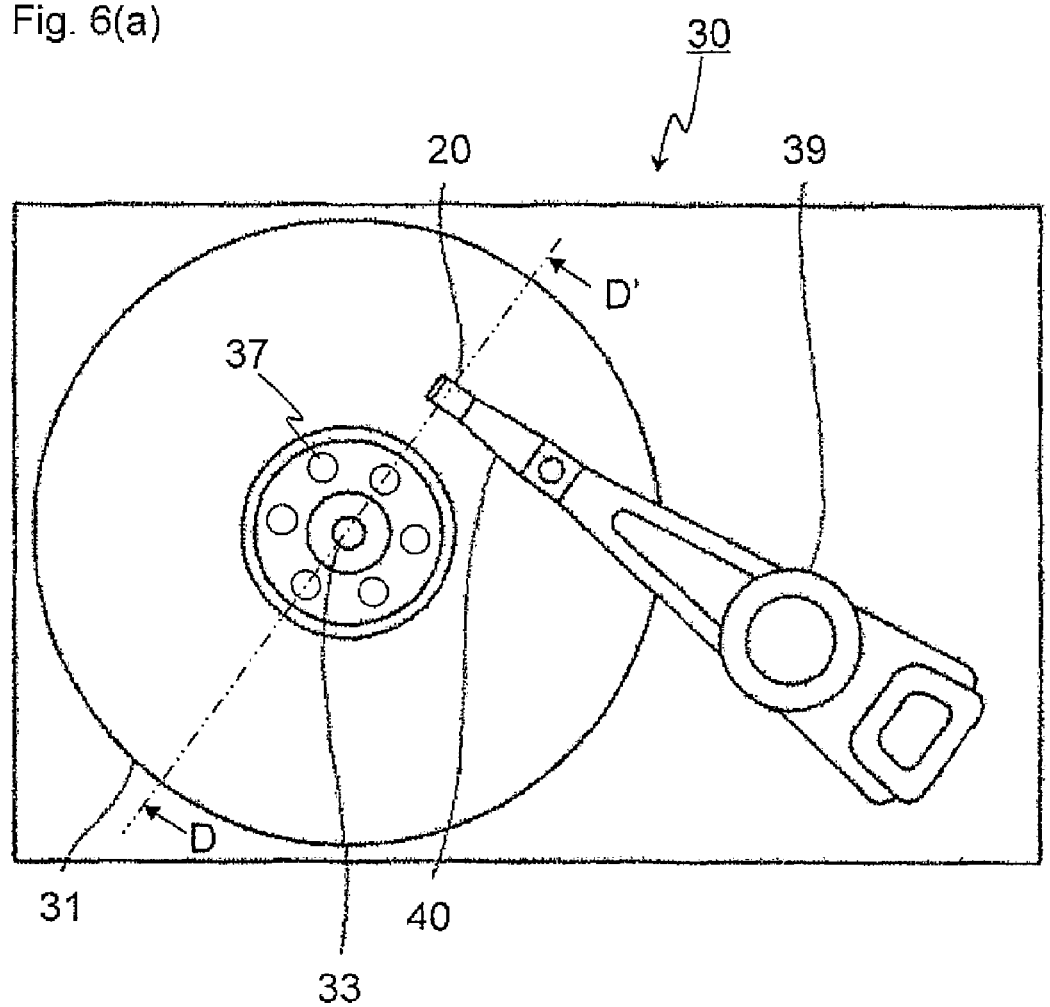
FIG. 6 schematically shows the constitution of an example of the recording medium drive unit (hard disk drive unit) having the magnetic head according to the present invention described above mounted thereon, (a) being a plan view thereof and (b) being a sectional view along D-D' in (a).
Figure 6B:
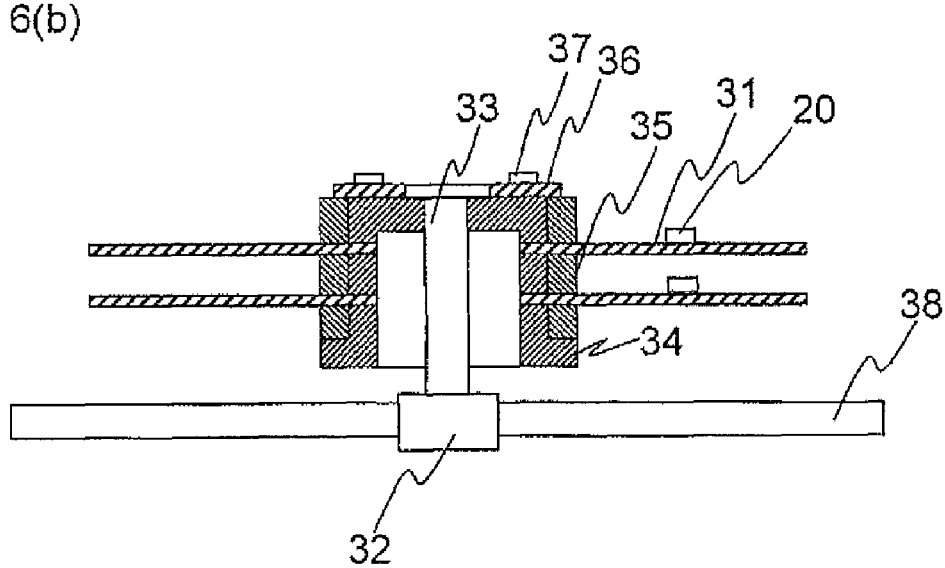

FIG. 6 schematically shows the constitution of an example of the recording medium drive unit (hard disk drive) having the magnetic head according to the present invention described above mounted thereon, (a) being a plan view thereof and (b) being a sectional view along D-D' in (a).

The recording medium drive unit 30 comprises the magnetic head 20 having the electromagnetic converter element 23 mounted on the slider 21 that is made by dividing the magnetic head substrate 10 into chips, the hard disk 31 that is a recording medium having the magnetic recording layer for recording and reproducing information by means of the magnetic head 20, and the motor 32 for driving the hard disk 31.

The hard disk 31 is mounted by setting a plurality of hard disks 31 and spacers 35 alternately on a hub 34 that is mounted on a rotary shaft 33 of the motor 32 and rotates with the rotary shaft 33, clamping the spacer 35 with a clamp 36 and securing the clamp 34 with a screw 37. The motor 32 is secured onto a chassis 38 of the recording medium drive unit 30 and drives the rotary shaft 33 thereby to rotate the hard disk 31.

The magnetic head 20 is fastened onto the distal end of a suspension 40 that is held at the base end thereof onto a carriage 39, and moves over the hard disk 31 without making contact therewith so as to make access to a track of the hard disk 31 and record or reproduce information. Since the recording medium drive unit 30 according to the present invention has such a constitution as described above, possibility is low for grain fall-off to occur from the magnetic head 20 and the recording medium drive unit 30 having high reliability can be made.

Figure 7A:
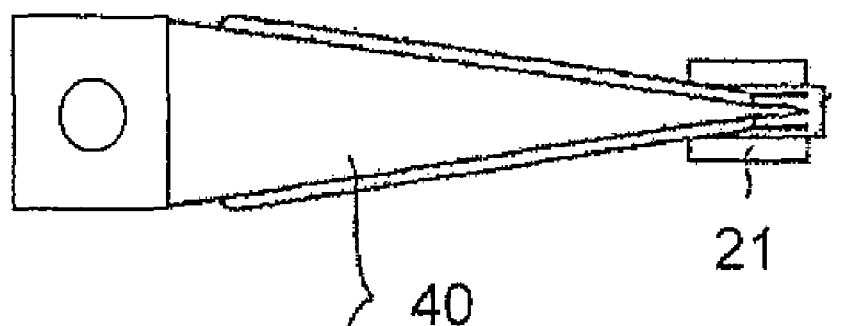
FIG. 7 is an enlarged diagram of the magnetic head that is fastened onto the distal end of a suspension, (a) being a bottom view, (b) being a front view and (c) being an enlarged side view.
Figure 7B:
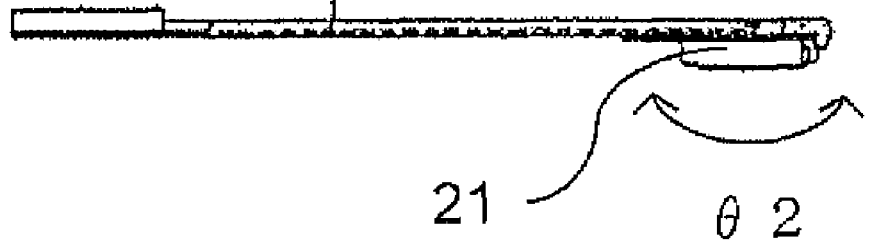
Figure 7C:
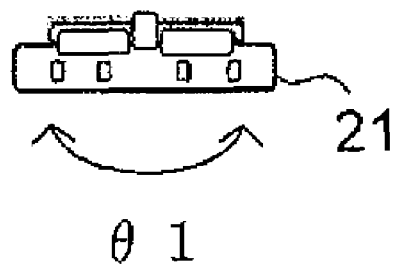

FIG. 7 is an enlarged diagram of the magnetic head 20 that is fastened onto the distal end of a suspension 40, (a) being a bottom view, (b) being a front view and (c) being an enlarged side view.

Floating characteristic of the magnetic head 20 according to the present invention refers to rolling and pitching of the magnetic head 20. Rolling is the floating characteristic in the direction indicated by θ1, and pitching is the floating characteristic in the direction indicated by θ2. The magnetic head 20 made from the magnetic head substrate 10 according to the present invention has stabled floating characteristic because of high homogeneity that decreases turbulent flow caused by the pores when floating.

The magnetic head 20 is formed from the magnetic head substrate 10 made from the ceramic sintered body having uniform crystal structure as described above, and therefore micro-cracks can be suppressed from being generated in the individual magnetic heads 20 that have been cut. Since grain come-off from the magnetic head 20 is effectively prevented from occurring, it can be preferably used in sliders of small size such as femto-slider and ato-slider.

In particular, the flow passage 21b is preferably formed with small arithmetic mean height Ra. When the arithmetic mean height Ra of the flow passage 21b is set to 25 nm or less, floating posture is stabilized because of decreased height difference caused by the difference between a reactivity at the $Al_2O_3$ crystal grains and a reactivity at the TiC crystal grains.

A method of manufacturing the magnetic head substrate from the ceramic sintered body according to the present invention will be described.

The ceramic sintered body according to the present invention is prepared as follows. First, an $Al_2O_3$ powder having a mean particle size in a range not less than 0.2 μm nor more than 0.5 μm, a TiC powder having a mean particle size in a range not less than 0.3 μm nor more than 1 μm and a $TiO_2$ powder having a mean particle size in a range not less than 0.03 μm nor more than 0.2 μm are mixed uniformly in a ball mill, vibration mill, colloid mill, high-speed mixer or the like.

The $Al_2O_3$ powder is effective in rendering mechanical strength and wear resistance to the sinter. The mean particle size of the $Al_2O_3$ powder is set in a range not less than 0.2 μm nor more than 0.5 μm, because mean particle size less than 0.2 μm may lead to poor molding characteristic and it becomes difficult to control for sintering, and mean particle size larger than 0.5 μm makes it difficult to obtain a dense sintered material and results in insufficient strength. Forming a dense sintered body requires it to heat to a high temperature. When the material is sintered at a high temperature, the mean crystal grain size of the $Al_2O_3$ crystal grains becomes larger, and proportion of mean crystal grain size of the external TiC crystal grains to the mean crystal grain size of the $Al_2O_3$ crystal grains may become less than 45%. Setting the mean particle size of the $Al_2O_3$ powder in a range not less than 0.2 μm nor more than 0.5 μm helps to increase the density, so that sintered material having the required strength can be easily obtained.

The TiC powder, in the sintered material, turns into electrically conductive grains so that electrostatic charge on the sintered body can be quickly removed. The mean particle size of the TiC powder is set in a range not less than 0.3 μm nor more than 1 μm, because the mean particle size less than 0.3 μm may lead to poor molding characteristic and it becomes difficult to control for the sintering process similarly to the case of the $Al_2O_3$ powder, and mean particle size larger than 1 μm allows TiC crystal grains to grow abnormally during sintering.

The $TiO_2$ powder is reduced and turned into TiC crystal grains when sintered, so as to quickly remove the electrostatic charge on the sintered body and also has an influence on the mean crystal grain size of the $Al_2O_3$ crystal grains.

The mean particle size of the $TiO_2$ powder is set in the range not less than 0.03 μm nor more than 0.2 μm, because the mean particle size less than 0.03 μm makes cohesive power of the $TiO_2$ powder too strong and increases the tendency of the $TiO_2$ powder to aggregate, and mean particle size larger than 0.2 μm decreases the sintering reactivity of the $TiO_2$ powder and makes it difficult to obtain dense sintered material. By setting the mean particle size of the $TiO_2$ powder in the range not less than 0.03 μm nor more than 0.2 μm, it is made possible to obtain dense sintered material as the $TiO_2$ powder does not aggregate and to lower the sintering temperature at which the $TiO_2$ powder turns into TiC crystal grains, so that growth of the $Al_2O_3$ crystal grains is suppressed and mean crystal grain size thereof can be decreased.

When preparing the ceramic sintered body according to the present invention, a crystal structure that contains both the internal TiC crystal grains and the external TiC crystal grains can be formed by adjusting the mean particles sizes of $Al_2O_3$, TiC and $TiO_2$.

It is made possible to control the proportion of area of the external TIC crystal grains to the area of the total TiC crystal grains in sectional view of the ceramic sintered body by controlling, for example, mean particle sizes of the TiC powder and the $TiO_2$ powder. To control the area proportion to not less than 80% and not higher than 99.7%, mean particle sizes of the TiC powder and the $TiO_2$ powder may be controlled within ranges not less than 0.3 μm nor more than 1.0 μm, and not less than 0.05 μm nor more than 0.2 μm, respectively.

The external TiC crystal grains can be made to exist in contact mainly with the $Al_2O_3$ crystal grains by increasing the difference between the mean grain size of the $Al_2O_3$ crystal grains and that of the TiC crystal grains, to 0.3 μm or more.

To control the mean crystal grain size of the $Al_2O_3$ crystal grains to 1.5 μm or less, the mean particle size of the $TiO_2$ powder may be controlled within a range not less than 0.3 μm nor more than 0.4 μm.

To control the content of TiC in the sintered body within a range not less than 36% by weight nor more than 50% by weight, composition may be controlled such that the content of the $Al_2O_3$ powder is within a range not less than 35% by weight nor more than 70% by weight, the content of the TiC powder is within a range not less than 20% by weight nor more than 64% by weight and the rest being the $TiO_2$ powder, with these powders totaling 100% by weight.

In order to accelerate the sintering process and increase the density, at least one of $Yb_2O_3$, $Y_2O_3$ and MgO may be added in a range not less than 0.05 part by weights nor more than 0.3 part by weights.

Mean particle sizes of the $Al_2O_3$, TiC and $TiO_2$ powders may be measured by liquid phase sedimentation method, light transmission method, laser scattering diffraction method or the like.

Then after adding a molding assisting agent such as binder, dispersant or the like to the mixed material and mixing uniformly, the material is formed into granules by a granulation machine such as rolling granulation machine, spray drier, compression granulation machine, extrusion granulation machine or the like. Then the granules thus obtained are molded into a desired shape by molding means such as dry pressure molding, cold isotropic static pressure molding or the like so as to make a green compact, which is placed in a pressure sintering apparatus.

Figure 8:
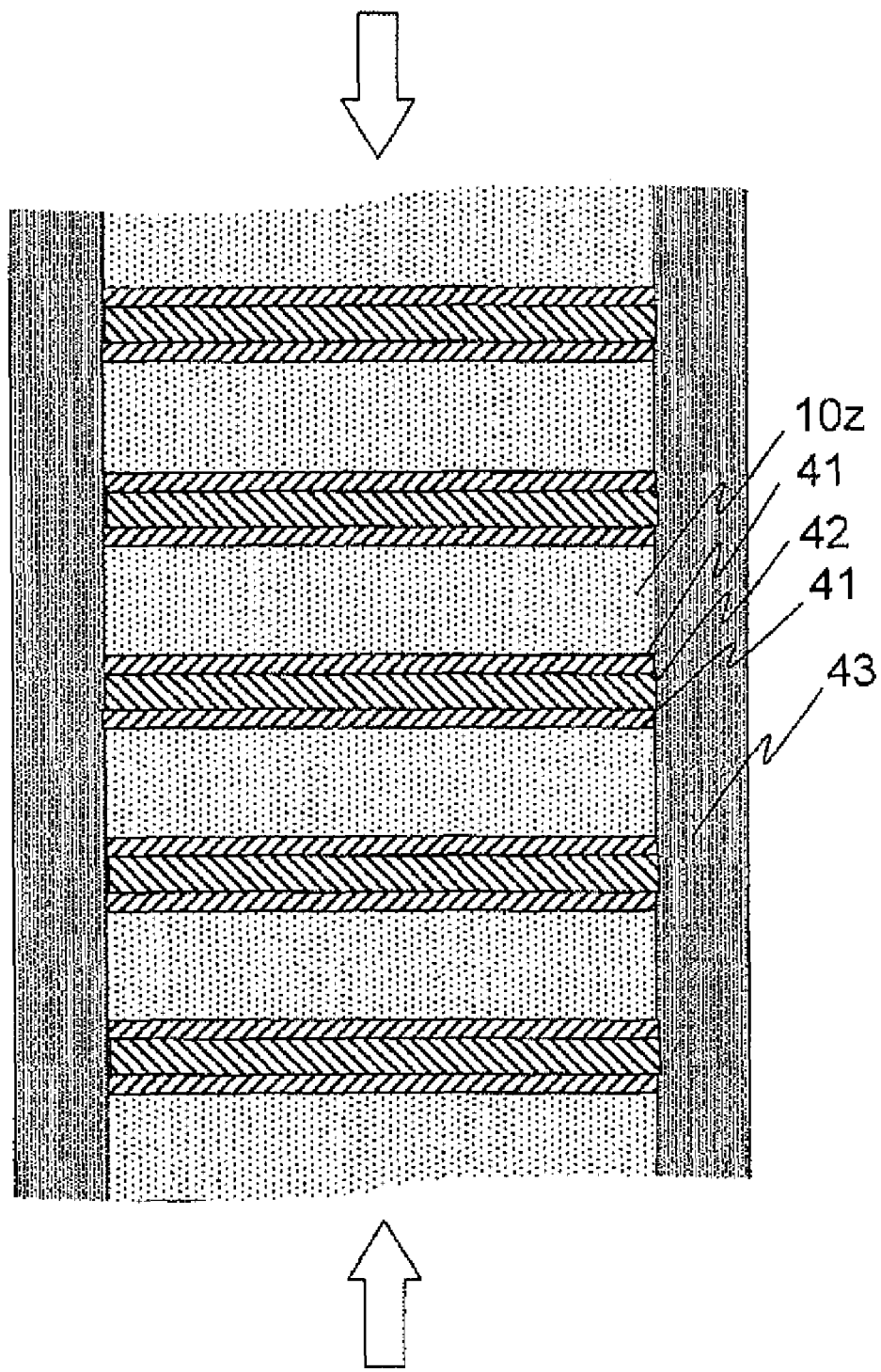
FIG. 8 is a sectional view showing the arrangement of the green compacts in the pressure sintering apparatus.

FIG. 8 is a sectional view showing the arrangement of the green compacts in the pressure sintering apparatus.

The preforms 10z are placed in a stack while being interposed between spacers 42 made of graphite via carbon sheets 41 that are embossed on both principal surfaces or porous carbon sheets 41. To obtain the magnetic head substrate 10 according to the present invention, the carbon sheets 41 may be put into contact with both principal surfaces of the preform 10z. To control the lattice constant of TiC in the principal surfaces 10a, 10b and the central portion 10c of the magnetic head substrate 10 and the difference thereof, embossed carbon sheets 41 may be used. This is because the embossed carbon sheets 41 put into contact with both principal surfaces of the preform 10z makes it easier to purge carbon dioxide ($CO_2$) that is generated through reduction of $TiO_2$ in the sintering process, thus making it possible to control the lattice constant of TiC in the principal surfaces 10a, 10b and the central portion 10c of the magnetic head substrate 10 and the difference thereof.

To control the difference in density between either of the principal surfaces 10a, 10b and the central portion 10c of the magnetic head substrate 10, porous carbon sheets 41 may be used. This is because the porous carbon sheets 41 put into contact with both principal surfaces of the preform 10z makes it easier to purge carbon dioxide ($CO_2$) that is generated through reduction of $TiO_2$ in the sintering process, thus making it possible to control the difference in density between either of the principal surfaces 10a, 10b and the central portion 10c of the magnetic head substrate 10 and keep the difference to 0.004 $g/cm^3$ or less.

The green compacts disposed as described above are subjected to pressure sintering process at a temperature from 1,400 to 1,700° C. in argon, helium or nitrogen atmosphere or in vacuum, and the magnetic head substrate 10 according to the present invention shown in FIG. 3 is obtained. It is important that the pressure sintering temperature is from 1,400 to 1,700° C. This is because sintering does not proceed sufficiently at a pressure sintering temperature lower than 1,400° C., and the TiC powder may grow and make non-uniform crystal structure thus disabling TiC to perform the effect thereof at a pressure sintering temperature higher than 1,700° C.

By setting the pressure sintering temperature in the range not less than 1,400 nor more than 1,700° C., it is made possible to distribute the TiC powder uniformly and set the density of distribution thereof to $5 \times 10^5/mm^2$ or higher so that the distance between the adjacent TiC crystal grains is 2 μm or less.

Among various sintering methods, the pressure sintering is selected because it makes it possible to increase the density and achieve the strength required for the magnetic head substrate 10. It is preferable to apply a pressure of 30 MPa or more.

It is also preferable to place a shielding material 43 that contains carbonaceous material around the green compacts 10z during the pressure sintering operation. This arrangement enables it to prevent the TiC crystal grains from being oxidized into TiO, $TiO_2$, etc. and make the magnetic head substrate 10 having high mechanical properties.

After the pressure sintering operation, hot isotropic pressure sintering operation (HIP) may be carried out as required.

For example, breakage strength of 700 MPa or higher can be achieved by applying hot isotropic pressure sintering (HIP) with a pressure from 150 MPa to 200 MPa at a temperature from 1,350 to 1,700° C. When it is desired to obtain the magnetic head substrate 10 having heat conductivity of 21 W/(m·K) or higher, hot isotropic pressure sintering (HIP) may be carried out at a temperature from 1,500 to 1,700° C.

When the magnetic head substrate 10 is made by sintering the green compacts 10z with embossed carbon sheets 41 being put into contact with both principal surfaces thereof, difference in lattice constant of TiC in the principal faces 10a, 10b and central portion 10c can be controlled to $1 \times 10^{-4}$ nm or less between either principal surface and the central portion in the direction of thickness, as described previously. Thus the substrate becomes dense with less variability in the density throughout the magnetic head substrate 10.

Also when the magnetic head substrate 10 is made by sintering the green compacts 10z with embossed carbon sheets 41 put into contact with both principal surface thereof, difference in density of the magnetic head substrate can be controlled to 0.004 g/cm$^3$ or less between either principal surface 10a, 10b and the central portion 10c. Therefore, localized concentration of pores can be prevented from taking place throughout the entire magnetic head substrate. As a result, when the magnetic head 20 is formed from this substrate 10, the magnetic head 20 of stable floating characteristic can be obtained, because of high homogeneity thereof.

The magnetic head substrate 10 shown in FIG. 4 can be obtained by cutting off a part of the magnetic head substrate 10 shown in FIG. 3 in the direction of thickness by means of a dicing saw.

When forming the flow passage 21b on the magnetic head 20, processing conditions of the ion milling process or the reactive ion etching process may be properly set. To form the flow passage 21b having arithmetic mean height (Ra) of 25 nm or less by the ion milling process, the operation may be carried out for a period of 75 to 125 minutes by using argon gas with acceleration voltage of 600 V at milling rate of 18 nm/minute. To form the flow passage surface 21b having arithmetic mean height (Ra) of 25 nm or less by reactive ion etching process, the operation may be carried out in a mixed gas atmosphere of Ar gas and CF$_4$ gas with flow rate of $3.4 \times 10^{-2}$ Pa·m$^3$/s and $1.7 \times 10^{-2}$ Pa·m$^3$/s, respectively, while setting the gas pressure to 0.4 Pa.

EXAMPLES

Examples according to the present invention will be described.

Example 1

First, an Al$_2$O$_3$ powder, a TiC powder and a TiO$_2$ powder were mixed in proportions shown in Table 1 to obtain a raw material. A raw material comprising an Al$_2$O$_3$ powder only and a raw material comprising a TiC powder only were also prepared.

The mean particle size of the Al$_2$O$_3$ powder was in a range not less than 0.2 μm nor more than 0.5 μm, mean particle size of TiC powder was in a range not less than 0.3 μm nor more than 1 μm, and mean particle size of the TiO$_2$ powder was in a range not less than 0.03 μm nor more than 0.2 μm.

0.1 part by weight of Yb$_2$O$_3$ powder as the sintering additive, a binder for molding and a dispersant were uniformly mixed based on 100 parts by weight of the raw material, so as to prepare a slurry. The slurry was charged into a spray drier so as to turn into granules, and was formed into a green compact by dry pressure molding process.

The green compacts were placed in specified molds and were subjected to pressure sintering process at a temperature of 1,650° C. in non-oxidizing atmosphere, followed by hot isotropic pressure sintering operation (HIP) carried out with a pressure of 180 MPa at a temperature of 1,600° C., thereby making the sinter.

The sintered body thus obtained were evaluated for area proportion ($S_{OT}/S_T$) fracture toughness and machinability.

Area proportion ($S_{OT}/S_T$) was determined by the following procedure. First, an arbitrary surface of the sintered material was polished by using diamond abrasive to mirror-finish, and this surface was etched with phosphoric acid for several tens of seconds. An image of a representative portion of the etched surface was captured by a scanning electron microscope (SEM) with a magnifying power of 13,000 times, and was used to identify the external TiC crystal grains and the internal TiC crystal grains. The SEM image was processed by free software Jtrim. Specifically, the SEM image was converted to grey scale and, after removing weak noise by means of a filter, contrast of the SEM image was determined.

The contrast was corrected by applying equalizer process (a kind of averaging) to the histogram of the contrasts. Then the SEM image was digitized, and total area of the TiC grains ($S_T$) and the total area of the external TiC crystal grains ($S_{OT}$) were calculated so as to determine the area proportion ($S_{OT}/S_T$).

Fracture toughness of the sintered body was measured in accordance to SEPB method specified in JIS R 1607-1995.

Machinability was evaluated by measuring the amount of material removed by polishing over a unit period of time in lapping operation (hereinafter referred to as lapping rate).

Figure 9:
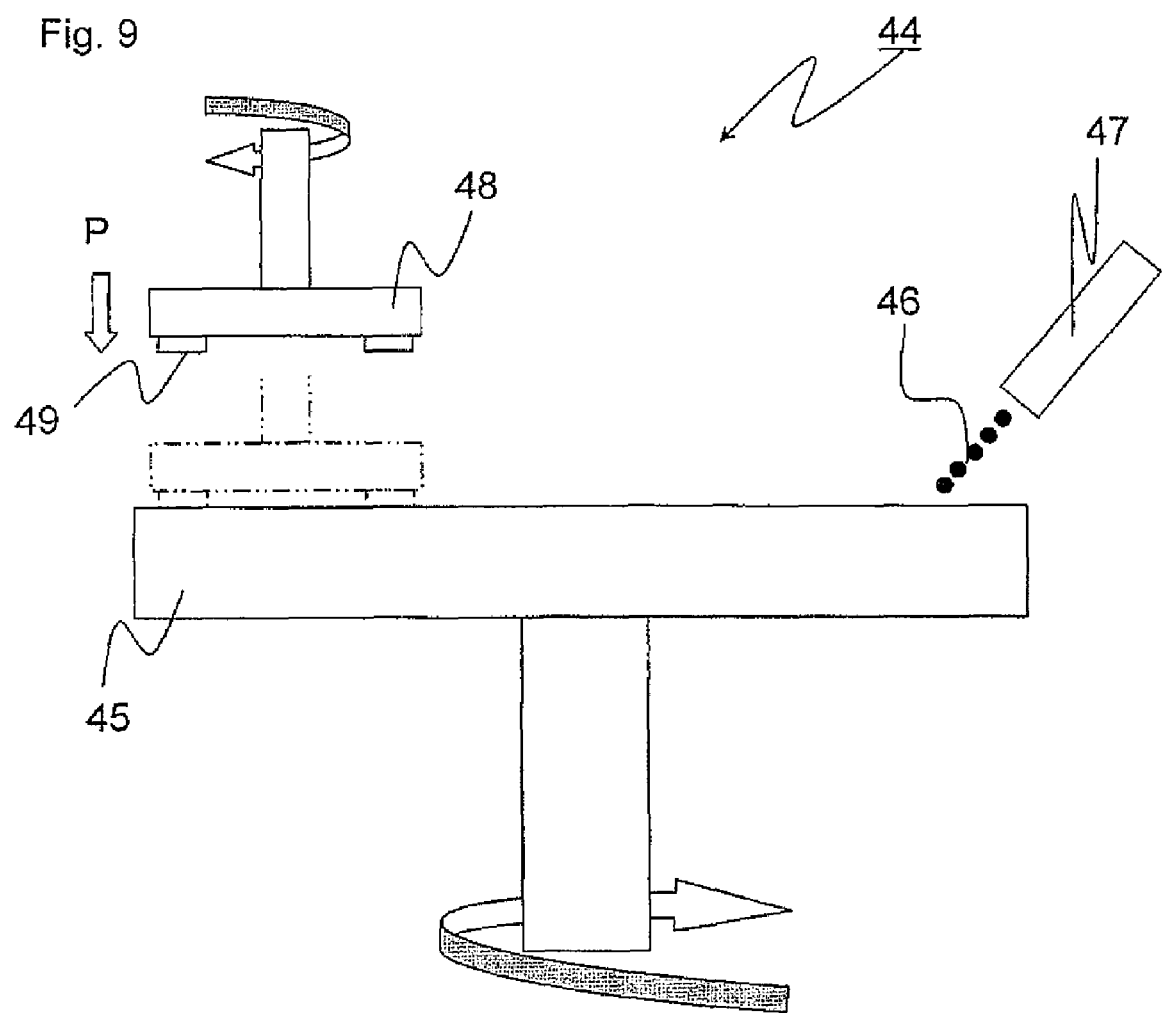
FIG. 9 schematically shows the constitution of a lapping machine used to polish the ceramic sintered body according to the present invention.

FIG. 9 schematically shows the constitution of a lapping machine 44 used to polish the sinter, and Lap master SFT type 9" was used in this Example. The lapping machine 44 has such a constitution as a polishing liquid 46 in the form of aqueous slurry is supplied from a container 47 while a lapping table 45 is driven to rotate by a drive section (not shown), so that the sintered body 49 placed on a lapping fixture 48 of circular shape rotates on the lapping table 45 under a pressure and is polished.

Figure 10:
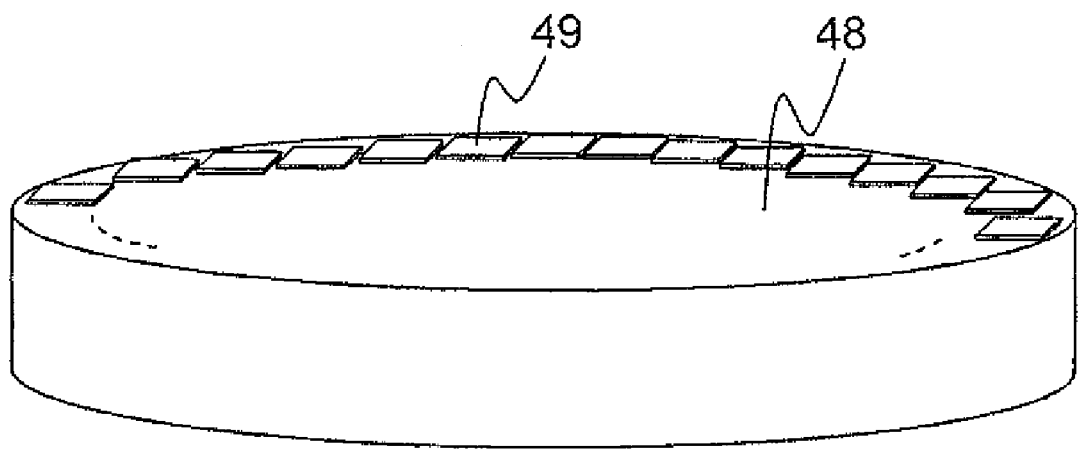
FIG. 10 is a perspective view showing the ceramic sintered body according to the present invention placed in a circular arrangement on a lapping fixture.

The polishing conditions were as follows. Using a polishing liquid 46 in the form of aqueous slurry, having hydrogen ion exponent pH 8.1, contained diamond abrasive having a mean particle size of 0.1 μm in a concentration of 0.5 g per liter, a lapping table 45 made of tin having a mean flatness of 10 μm or less and Vickers hardness (H) of 78 MPa, and a lapping fixture of circular shape 48, 30 pieces of the sintered body 49 having area of 10 mm by 10 mm in a plane perpendicular to the direction of thickness were placed in a circular arrangement at equal intervals on the lapping fixture of circular shape 48, as shown in FIG. 10. The polishing liquid 46 was supplied onto the lapping table 45 while rotating at a peripheral speed of 0.5 m/s under a pressure of 0.08 MPa. Lap master SFT type 9" was used for the lapping apparatus 44. The lapping table 45 had a rectangular groove formed in a spiral configuration, with adjacent grooves disposed at a distance of 0.3 mm.

The results of the measurements are shown in Table 1.

TABLE 1

| Sample No. | Al$_2$O$_3$ (% by weight) | TiC (% by weight) | TiO$_2$ (% by weight) | Area ratio (S$_{oT}$/S$_t$) (%) | Fracture toughness K$_{Ic}$ (MPa·m$^{1/2}$) | Lapping rate (μm/min.) |
|---|---|---|---|---|---|---|
| *1 | 64.0 | 36.0 | 0.0 | 0.0 | 6.0 | 0.06 |
| 2 | 64.0 | 33.8 | 2.2 | 99.9 | 3.6 | 0.07 |
| 3 | 64.0 | 30.6 | 5.4 | 99.7 | 3.6 | 0.08 |
| 4 | 64.0 | 29.9 | 6.1 | 95.5 | 3.8 | 0.1 |
| 5 | 95.0 | 4.0 | 1.0 | 85.5 | 4.0 | 0.09 |
| 6 | 55.0 | 36.0 | 9.0 | 80.0 | 4.1 | 0.1 |
| 7 | 55.0 | 45.0 | 0.0 | 75.0 | 4.2 | 0.08 |

The symbol * denotes a value which is not within the scope according to the present invention.

As shown in Table 1, samples Nos. 2 to 7 according to the present invention included the internal TiC crystal grains and the external TiC crystal grains and therefore demonstrated good machinability with lapping rate not lower than 0.07 μm per minute and not higher than 1 μm per minute, while showing proper fracture toughness of not lower than 3.6 MPa·m$^{1/2}$ and not higher than 4.2 MPa·m$^{1/2}$. Samples Nos. 3 to 6, in particular, showed area proportion of the external TiC crystal grains (S$_{OT}$/S$_T$) not lower than 80% and not higher than 99.7%, and therefore demonstrated better machinability with lapping rate not lower than 0.08 μm per minute and not higher than 1 μm per minute, while showing proper fracture toughness of not lower than 3.6 MPa·m$^{1/2}$ and not higher than 4.1 MPa·m$^{1/2}$.

Sample No. 1 of Comparative Example, in contrast, had area proportion (S$_{OT}$/S$_T$) of 0%, which means that all TiC crystal grains are internal TiC crystal grains without any external TiC crystal grains, and therefore showed high fracture toughness of 6 MPa·m$^{1/2}$ and low lapping rate of 0.06 μm per minute.

Example 2

An Al$_2$O$_3$ powder, a TiC powder and a TiO$_2$ powder were mixed in proportions shown in Table 2 to obtain a raw material, similarly to Example 1.

Mean particle sizes of the Al$_2$O$_3$ powder, TiC powder and TiO$_2$ powder were set the same as the mean particle sizes of the respective powders used in Example 1, with the powders mixed in proportions shown in Table 2. 0.1 part by weight of Yb$_2$O$_3$ powder as the sintering additive, a binder for molding and a dispersant were uniformly mixed based on 100 parts by weight of the raw material, so as to prepare a slurry. The slurry was charged into a spray drier so as to turn into granules, and was formed into a green compact by dry pressured molding process.

The green compacts were placed in specified molds and were sintered under the same firing conditions as those used in Example 1, thereby making the sinter.

The proportion of Ti in each sample was measured by ICP emission spectroscopic analysis was converted to the weight of TiC. Measurements were also made for relative density in accordance to JIS R 1634-1998 and for volume specific resistance in accordance to JIS C 2141-1992.

The results of the measurements are shown in Table 2.

TABLE 2

| Sample No. | Al$_2$O$_3$ (% by weight) | TiC (% by weight) | TiO$_2$ (% by weight) | TiC content (% by weight) | Relative density (%) | Volume specific resistance (Ω·m) |
|---|---|---|---|---|---|---|
| 8 | 35 | 60 | 5 | 65 | 99.3 | 1.8 × 10$^{-6}$ |
| 9 | 50 | 40 | 10 | 50 | 99.8 | 4.6 × 10$^{-6}$ |
| 10 | 64 | 33 | 3 | 36 | 99.9 | 1.0 × 10$^{-5}$ |
| 11 | 95 | 5 | 0 | 5 | 99.9 | 2.9 × 10$^8$ |
| 12 | 95 | 4.2 | 0.6 | 4.8 | 99.9 | 5.3 × 10$^{10}$ |

As shown in Table 2, samples Nos. 9 and 10 included the TiC content in the sintered body in a range not less than 36% by weight nor more than 50% by weight, and therefore showed high relative density of 99.8% and low volume specific resistance of 1.0×10$^{-5}$ Ω·m, thus making dense sintered body having electrical conductivity.

Samples Nos. 11 and 12, in contrast, included TiC content of less than 36% by weight, and therefore showed high volume specific resistance of 2.9×10$^8$ Ω·m, thus resulting in low electrical conductivity. Sample No. 8 included TiC content exceeding 50% by weight, and therefore showed low relative density and poor machinability.

Example 3

An Al$_2$O$_3$ powder, a TiC powder and a TiO$_2$ powder were mixed in proportions shown in Table 3 to obtain a raw material, similarly to Example 1.

Mean particle sizes of the Al$_2$O$_3$ powder, TiC powder and TiO$_2$ powder were set to the same values as the mean particle sizes of the respective powders used in Example 1, with the powders mixed in proportions shown in Table 3. 0.1 part by weight of the Yb$_2$O$_3$ powder as the sintering additive, a binder for molding and a dispersant were uniformly mixed based on 100 parts by weight of the raw material, so as to prepare a slurry. The slurry was charged into a spray drier so as to turn into granules, and was formed into a green compact by dry pressured molding process.

The green compacts were placed in specified molds and were sintered under the same firing conditions as those used in Example 1, thereby making the sinter.

The mean crystal grain size of the Al$_2$O$_3$ crystal grains and the external TiC crystal grains were measured. First, an arbitrary surface of the sintered material was polished by using diamond abrasive to mirror-finish, and this surface was etched with phosphoric acid for several tens of seconds. The etched surface was photographed with a scanning electron microscope (SEM) with a magnifying power of 13,000 times. 20 pieces each of the Al$_2$O$_3$ crystal grains and the external TiC crystal grains were picked from the SEM image. Maximum size across each of the crystal grains was measured, and averaged to determine the mean crystal grain size. From the mean crystal grain size, proportion of mean crystal grain size of the external TiC crystal grains to mean crystal grain size of the Al$_2$O$_3$ crystal grains was calculated.

The samples were evaluated for machinability, by lapping the samples under the same polishing conditions as those of Example 1, and measuring the lapping rate. The lapped sintered body was divided by means of a diamond grinder (SD800) into chips measuring 1.25 mm in length, 1.0 mm in width and 0.3 mm in thickness. Number of chippings having depth of 5 μm or more on a straight line 1.25 mm in length formed by a side face and the top surface was counted under a metallurgical microscope with a magnifying power of 200 times.

The flow passage was formed on the floating surface with a depth of 0.2 μm by the reactive ion etching process or the ion milling process. The difference in height caused by the difference between the reactivity of the $Al_2O_3$ crystal grains and that of the TiC crystal grains was measured over a length of 10 μm by means of an atomic force microscope in accordance to JIS B 0601-2001, to determine the arithmetic mean height (Ra).

Sample No. followed by letter a in Table 3 indicates a sample that has the flow passage formed by the ion milling process, and sample No. followed by letter b indicates a sample that has the flow passage formed by the reactive ion etching process.

Additional sintered materials were made for measuring the volume specific resistance by the same manufacturing method as described above, and the volume specific resistance was measured in accordance to JIS C 2141-1992.

The results of the measurements are shown in Table 3.

Sample No. 19, in which the proportion of the mean crystal grain size of the external TiC crystal grains to mean crystal grain size of the $Al_2O_3$ crystal grains was less than 45%, showed large arithmetic mean height Ra of the flow passage, and sample No. 15, in which proportion of mean crystal grain size of the external TiC crystal grains to mean crystal grain size of the $Al_2O_3$ crystal grains exceeded 95%, showed a large number of chippings that counted 36.

Example 4

An $Al_2O_3$ powder, a TiC powder and a $TiO_2$ powder were mixed in proportions shown in Table 4 to obtain a raw material, similarly to Example 1.

Mean particle sizes of the $Al_2O_3$ powder, TiC powder and $TiO_2$ powder were set to the same values as the mean particle sizes of the respective powders used in Example 1, with the powders mixed in proportions shown in Table 4. 0.1 part by

TABLE 3

| Sample No. | $Al_2O_3$ (% by weight) | TiC (% by weight) | $TiO_2$ (% by weight) | Mean crystal grain size (A) of $Al_2O_3$ crystal grains (μm) | Mean crystal grain size (B) of extrenal TiC crystal grains (μm) | Grain size ratio (B/A) (%) | Volume specific resistance ($\Omega \cdot m$) | Lapping rate (μm/min.) | Chippings (number) | Arithmetic mean height Ra of flow passage (nm) |
|---|---|---|---|---|---|---|---|---|---|---|
| 13a | 80.0 | 18.0 | 2.0 | 0.71 | 0.52 | 73 | $1.8 \times 10^{-6}$ | 0.11 | 12 | 2 |
| 13b | | | | | | | | | | 24 |
| 14a | 64.0 | 33.0 | 3.0 | 0.70 | 0.55 | 79 | $1.0 \times 10^{-6}$ | 0.1 | 14 | 4 |
| 14b | | | | | | | | | | 23 |
| 15a | 64.0 | 31.0 | 5.0 | 0.80 | 0.80 | 100 | $2.0 \times 10^{-5}$ | 0.06 | 36 | 4 |
| 15b | | | | | | | | | | 39 |
| 16a | 64.0 | 31.0 | 5.0 | 0.63 | 0.60 | 95 | $2.0 \times 10^{-5}$ | 0.12 | 12 | 4 |
| 16b | | | | | | | | | | 23 |
| 17a | 64.0 | 29.0 | 7.0 | 1.50 | 0.80 | 53 | $2.6 \times 10^{-5}$ | 0.06 | 23 | 4 |
| 17b | | | | | | | | | | 25 |
| 18a | 64.0 | 27.0 | 9.0 | 1.78 | 0.80 | 45 | $2.3 \times 10^{-5}$ | 0.04 | 24 | 4 |
| 18b | | | | | | | | | | 25 |
| 19a | 64.0 | 27.0 | 9.0 | 1.83 | 0.80 | 44 | $2.3 \times 10^{-5}$ | 0.05 | 25 | 10 |
| 19b | | | | | | | | | | 46 |

As shown in Table 3, samples Nos. 13, 14 and 16, in which mean crystal grain size of the $Al_2O_3$ crystal grains was 1.5 μm or less and mean crystal grain size of the external TiC crystal grains was 0.6 μm or less, showed high lapping rate of 0.1 μm per minute with 14 or less chippings and arithmetic mean height Ra of 24 μm or less, thus demonstrating high machinability.

Samples Nos. 13, 14 and 16 to 18, in which proportion of mean crystal grain size of the TiC crystal grains to mean crystal grain size of the $Al_2O_3$ crystal grains was in a range not less than 45% nor more than 95%, showed small arithmetic mean height Ra of 25 μm or less and few chippings, counting 24 or less.

Samples Nos. 13a, 14a, 15a, 16a, 17a and 18a, in which flow passage was formed by the ion milling process showed smaller arithmetic mean height Ra of the flow passage than samples Nos. 13b, 14b, 15b, 16b, 17b and 18b, in which the flow passage was formed by the reactive ion etching process.

Samples Nos. 18 and 19, in which mean crystal grain size of the $Al_2O_3$ crystal grains exceeded 1.5 μm and mean crystal grain size of the external TiC crystal grains exceeded 0.6 μm, in contrast, showed low lapping rate of 0.05 μm per minute. Samples Nos. 15 and 17 to 19, in which mean crystal grain size of external TiC crystal grains exceeded 0.6 μm, in contrast, showed low electrical conductivity because of weak electrical discharge generated on the surface of the sinter.

weight of the $Yb_2O_3$ powder as the sintering additive, a binder for molding and a dispersant were uniformly mixed based on 100 parts by weight of the raw material, so as to prepare a slurry. The slurry was charged into a spray drier so as to turn into granules, and was formed into a green compact by dry pressured molding process. The green compacts were placed in specified molds and were sintered under the same firing conditions as those used in Example 1, thereby making a sintered body.

An arbitrary surface of the sintered material was polished by using diamond abrasive to mirror-finish, and this surface was etched with phosphoric acid for several tens of seconds. A representative portion of the etched surface was photographed under a scanning electron microscope (SEM) with a magnifying power of 13,000 times. The proportion of the $Al_2O_3$ powder shown in this image that were in direct contact with a plurality of external TiC crystal grains was determined as the contact ratio.

Machinability was evaluated by measuring the lapping rate by lapping under the same polishing conditions as those of Example 1.

The results of the measurements are shown in Table 4.

TABLE 4

| Sample No. | Al₂O₃ (% by weight) | TiC (% by weight) | TiC₂ (% by weight) | Contact ratio (%) | Lapping rate (μm/min) |
|---|---|---|---|---|---|
| 20 | 50.0 | 50.0 | 7.5 | 92.0 | 0.12 |
| 21 | 80.0 | 16.0 | 4.0 | 85.0 | 0.09 |
| 22 | 95.0 | 4.5 | 0.5 | 70.0 | 0.06 |

As shown in Table 4, sample No. 20 had high contact ratio and therefore showed higher lapping rate and better machinability than samples Nos. 21 and 22 that had lower contact ratios.

Example 5

An $Al_2O_3$ powder, a TiC powder and a $TiO_2$ powder were mixed in proportions shown in Table 5 to obtain the raw material, similarly to Example 1.

Mean particle sizes of the $Al_2O_3$ powder, TiC powder and $TiO_2$ powder were set the same as the mean particle sizes of the respective powders used in Example 1, with the powders mixed in proportions shown in Table 5. 0.1 part by weight of the $Yb_2O_3$ powder as the sintering additive, a binder for molding and a dispersant were uniformly mixed based on 100 parts by weight of the raw material, so as to prepare a slurry. The slurry was charged into a spray drier so as to turn into granules, and was formed into a green compact by dry pressured molding process. The green compacts were placed in specified molds and were sintered under the same firing conditions as those used in Example 1, thereby making a sintered body.

Heat conductivity of the sintered body thus obtained was measured in accordance to JIS R 1611-1997.

Machinability of the sintered body was evaluated by measuring the lapping rate by lapping under the same polishing conditions as those of Example 1 and observing to see whether grain fall-off occurred or not.

Grain fall-off was checked by observing under a metallurgical microscope with a magnifying power of 200 times, and sample without grain fall-off measuring 2 μm or longer was ranked as A and sample without grain fall-off measuring 2 μm or longer was ranked as B.

The results of the measurements and observation are shown in Table 5.

TABLE 5

| Sample No. | Al₂O₃ (% by weight) | TiC (% by weight) | TiO₂ (% by weight) | Heat conductivity (W/(m·K)) | Lapping rate (μm/min.) | Grain fall-off |
|---|---|---|---|---|---|---|
| 23 | 64.0 | 29.9 | 6.1 | 23 | 0.1 | A |
| 24 | 64.0 | 28.8 | 7.2 | 21 | 0.08 | A |
| 25 | 64.0 | 25.9 | 10.1 | 18 | 0.04 | B |

As shown in Table 5, samples Nos. 23 and 24, in which heat conductivity was 21 W/(m·K) or higher, grain fall-off was not observed. Sample No. 25, in which heat conductivity was less than 21 W/(m·K), grain fall-off was observed. It was found that samples Nos. 23 to 25 had preferable characteristic with lapping rate increasing as heat conductivity increased.

Example 6

Specified amounts of an $Al_2O_3$ powder, a TiC powder, a $TiO_2$ powder, a $Yb_2O_3$ powder, a binder for molding and a dispersant were mixed to prepare a slurry. The slurry was charged into a spray drier so as to turn into granules, and was formed into a green compact by dry pressured molding process. The green compacts were disposed in a stack of 20 levels and were subjected to pressured sintering process in Argon atmosphere, followed by hot isotropic pressure sintering operation (HIP), thereby making samples Nos. 26 to 30, 32 to 35 and 37 to 39 of the magnetic head substrate measuring 152.4 mm in diameter and 3 mm in thickness.

For the carbon sheets 41, embossed carbon sheets were used.

Samples Nos. 31 and 36 were magnetic head substrate, that were subjected to pressured sintering process but were not subjected to hot isotropic pressure sintering operation (HIP).

Samples Nos. 40 and 41 were made by disposing green compacts in a stack with spacers 42 made of graphite being put into contact with both principal surfaces of the green compacts and applying pressured sintering process and hot isotropic pressure sintering operation (HIP) in a procedure similar to that described above, thereby making a magnetic head substrate measuring 152.4 mm in diameter and 3 mm in thickness.

Six samples were prepared for each type of composition, and were evaluated by measuring the proportions of $Al_2O_3$ and TiC, lattice constant, arithmetic mean height Ra that indicates the surface roughness, lapping rate, volume specific resistance, heat conductivity and three-point bending strength by procedures described below.

Proportions of $Al_2O_3$ and TiC in 100% by weight of the elements that constitute the magnetic head substrate (excluding carbon (C) oxygen (O)) were determined by measuring the proportions of Al and Ti by ICP emission spectroscopic analyzer (ICPS-8100 manufactured by Shimadzu Corporation), and converting the Al content to oxide content and Ti content to carbide content, with the results shown in Table 6.

The lattice constant of the sample of each type of composition was measured as follows. Test specimens were cut out of the principal surfaces and the central portion of the sample, and were irradiated with characteristic X rays of $CuK_{\alpha 1}$, to obtain X-ray diffraction pattern by scanning over a range of diffraction angle (2θ) of 20°≦2θ≦110° at steps of 0.008°. The X-ray diffraction pattern was analyzed by Rietvelt method using RIETAN-2000 program, thereby to determine the lattice constant. Since the lattice constant varies depending on the peak profile of the diffraction line from the crystal plane of TiC crystal grains case, the peak profile was constrained by using Toratani's division pseudo-voigt function. Lattice constant was measured at three points of both principal surfaces and the central portion at ten positions (substantially the same positions in both principal surfaces and the central portion in the direction of thickness) of the test specimen cut out of the principal surfaces and the central portion on the upper surface and lower surface sides. Mean values of the measurements taken at 20 positions in both principal surfaces (10 positions×surfaces (principal surfaces on the upper surface and lower surface sides) and 10 positions in the central portion, and the difference between the mean values were calculated. The results are shown in Table 6.

Arithmetic mean height (Ra) that indicates the surface roughness was measured on the sample of each type of composition. Test specimens were cut out of the principal surfaces and the central portion of the sample of each type, similarly to the measurement of lattice constant. The test specimens were subjected to ion milling process by using an ion milling apparatus (AP-MIED manufactured by JEOL Ltd.). With acceleration voltage of 3 kV, current of 30 mA, argon gas pressure of 1 Pa and collision angle of 35° between ion gun and the sample, the surface was milled to a depth of 0.2 μm. Arithmetic mean height (Ra) was measured on the principal surfaces and the central portion in areas of 30 nm×30 nm of the machine surface by using tapping mode for the measurement method and Si probe as the measuring probe by means of an atomic force microscope (AFM) (D3000 manufactured by Digital Instrument). Table 6 shows the mean value of arithmetic mean height (Ra) on the principal surfaces, the measured value of arithmetic mean height (Ra) on the central portion, and the absolute value of the difference therebetween.

Machinability of the magnetic head substrate was evaluated by measuring the amount of material removed by polishing over a unit period of time in lapping operation (hereinafter referred to as lapping rate), under the same conditions as the polishing conditions of Example 1, except for setting the pressure to 0.07 MPa and peripheral speed to 0.65 m/s.

Volume specific resistance, heat conductivity and three-point bending strength were measured on the test specimen of each type of composition in accordance to JIS C 2141-1992, JIS R 1611-1997 and JIS R 1601-1995. The thickness was set to 2 mm for all test specimens used to measure three-point bending strength.

The results of the measurements are shown in Table 6.

As shown in Table 6, samples Nos. 28 to 30 and 32 to 39, that contained TiC in a range not less than 30% by weight nor more than 65% by weight, showed high electrical conductivity and high machinability. Also in samples Nos. 28 to 30 and 32 to 39, since the difference between a lattice constant of TiC at the principal surfaces and a lattice constant of TiC at the central portion was $1\times10^{-4}$ nm or less, difference between an arithmetic mean height (Ra) at the principal surfaces and an arithmetic mean height (Ra) at the central portion is smaller than those in samples Nos. 27, 31, 40 and 41, and can be machined with high precision all over the substrate and the crystal structure of the substrate is uniform.

In samples Nos. 35 and 37 to 39, since the lattice constant of TiC in the principal surfaces and the central portion is in a range not less than 0.43150 nm nor more than 0.43168 nm, difference between the arithmetic mean height (Ra) at the principal surfaces and the arithmetic mean height (Ra) at the central portion is as small as 0.28 nm or less, showing even better uniformity of the substrate.

Samples Nos. 34 to 37 contained TiC in a range not less than 35% by weight nor more than 40% by weight, and therefore showed well-balanced electrical conductivity and machinability.

TABLE 6

| Sample No. | Content (% by weight) $Al_2O_3$ | Content (% by weight) TiC | Lattice constant L1 (nm) (Central portion) | Lattice constant L2 (nm) (Principal surfaces) | Diffrence in lattice constant $\Delta L = |L2 - L1|$ (nm) | Arithmetic mean height Ra1, Ra2 (nm) (Central portion) | Arithmetic mean height Ra1, Ra2 (nm) (Principal surfaces) | Difference $\Delta Ra = |Ra2 - Ra1|$ (nm) |
|---|---|---|---|---|---|---|---|---|
| 26 | 20 | 80 | — | — | — | — | — | — |
| 27 | 34 | 66 | 0.43208 | 0.43223 | 0.00015 | 4.43 | 3.65 | 0.78 |
| 28 | 35 | 65 | 0.43210 | 0.43220 | 0.00010 | 4.28 | 3.85 | 0.43 |
| 29 | 55 | 45 | 0.43185 | 0.43194 | 0.00009 | 4.56 | 3.67 | 0.89 |
| 30 | 55 | 45 | 0.43187 | 0.43195 | 0.00008 | 4.24 | 3.51 | 0.73 |
| 31 | 55 | 45 | 0.43173 | 0.43194 | 0.00021 | 5.34 | 3.58 | 1.76 |
| 32 | 55 | 45 | 0.43184 | 0.43193 | 0.00009 | 4.21 | 3.53 | 0.68 |
| 33 | 59 | 41 | 0.43188 | 0.43194 | 0.00006 | 4.05 | 3.40 | 0.65 |
| 34 | 60 | 40 | 0.43184 | 0.43192 | 0.00008 | 3.98 | 3.32 | 0.66 |
| 35 | 64 | 36 | 0.43166 | 0.43168 | 0.00002 | 2.67 | 2.87 | 0.20 |
| 36 | 64 | 36 | 0.43157 | 0.43164 | 0.00007 | 3.53 | 2.67 | 0.86 |
| 37 | 65 | 35 | 0.43160 | 0.43162 | 0.00002 | 2.48 | 2.59 | 0.11 |
| 38 | 66 | 34 | 0.43157 | 0.43160 | 0.00003 | 2.43 | 2.52 | 0.09 |
| 39 | 70 | 30 | 0.43150 | 0.43159 | 0.00009 | 2.73 | 2.45 | 0.28 |
| 40 | 85 | 15 | 0.43148 | 0.43161 | 0.00013 | 4.25 | 2.34 | 1.91 |
| 41 | 64 | 36 | 0.43145 | 0.43160 | 0.00015 | 7.23 | 3.64 | 3.59 |

| Sample | Lapping rate (μm/hour) | Volume specific resistance ($\Omega \cdot cm$) | Heat consuctivity (W/(m · K)) | Three-point bending strength (MPa) | Remarks |
|---|---|---|---|---|---|
| 26 | — | — | — | — | Poor sintering |
| 27 | 12 | $4.5 \times 10^{-4}$ | 17 | 600 | |
| 28 | 12 | $4.0 \times 10^{-4}$ | 18 | 700 | |
| 29 | 12 | $9.0 \times 10^{-4}$ | 18 | 890 | |
| 30 | 12 | $8.5 \times 10^{-4}$ | 18 | 860 | |
| 31 | 15 | $1.0 \times 10^{-3}$ | 18 | 750 | HIP was not performed |
| 32 | 12 | $8.0 \times 10^{-4}$ | 18 | 880 | |
| 33 | 13 | $1.2 \times 10^{-3}$ | 18 | 900 | |
| 34 | 13 | $1.0 \times 10^{-3}$ | 18 | 900 | |
| 35 | 14 | $2.0 \times 10^{-3}$ | 20 | 920 | |
| 36 | 14 | $2.0 \times 10^{-3}$ | 19 | 680 | HIP was not performed |
| 37 | 15 | $2.5 \times 10^{-3}$ | 21 | 925 | |
| 38 | 15 | $2.7 \times 10^{-3}$ | 21 | 930 | |
| 39 | 18 | $3.0 \times 10^{-3}$ | 22 | 940 | |
| 40 | 23 | $1.0 \times 10^{10}$ | 24 | 950 | |
| 41 | 15 | $2.0 \times 10^{-3}$ | 20 | 860 | |

In samples Nos. 35 to 39, in which heat conductivity is 19 W/(m·K) or higher, when the magnetic head is made from this material, heat generated from the electromagnetic converter element mounted on the slider can be quickly dissipated so that the information recorded on the recording medium can be suppressed from being destroyed.

In samples Nos. 28 to 30, 32 to 35 and 37 to 39, three-point bending strength is 700 MPa or higher and therefore microcracks are suppressed from being generated even when divided into sliders of chip shape, so that magnetic head having satisfactory CSS (contact-start-stop) characteristic can be obtained.

Example 7

Specified amounts of an $Al_2O_3$ powder, a TiC powder, a $TiO_2$ powder, an $Yb_2O_3$ powder, a binder for molding and a dispersant were mixed to prepare a slurry. The slurry was charged into a spray drier so as to turn into granules, and was formed into a green compact by dry pressed molding process. The green compacts were disposed in a stack of 20 levels and were subjected to pressured sintering process in Argon atmosphere, followed by hot isotropic pressure sintering operation (HIP), thereby making samples Nos. 42 to 46 and 48 to 50 of the magnetic head substrate measuring 152.4 mm in diameter and 3 mm in thickness.

For the carbon sheets 41, embossed carbon sheets were used.

Samples Nos. 47 and 52 were magnetic head substrates, that were subjected to pressured sintering process but were not subjected to hot isotropic pressure sintering operation (HIP).

Sample No. 51 was made by disposing green compacts in a stack with spacers made of graphite being put into contact with both principal surfaces of the green compacts and applying the pressured sintering process and hot isotropic pressure sintering operation (HIP) in a procedure similar to that described above, thereby making the magnetic head substrate measuring 152.4 mm in diameter and 3 mm in thickness.

Six samples were prepared for each type of composition, and were evaluated by measuring the proportions of $Al_2O_3$ and TiC, density, number of pores, lapping rate, volume specific resistance, heat conductivity and three-point bending strength by procedures described below.

Proportions of $Al_2O_3$ and TiC in 100% by weight of the elements that constitute the magnetic head substrate (excluding carbon (C) oxygen (O)) were determined by measuring the proportions of Al and Ti by ICP emission spectroscopic analyzer (SPS1200VR manufactured by Seiko Instruments Inc.), and converting the Al content to oxide content and Ti content to carbide content, with the results shown in Table 7.

Density of the sample of each type of composition was measured as follows. Test specimens were cut out of the central portion and the principal surfaces on the top surface and bottom surface sides, and apparent density of each test specimen was measured in accordance to JIS R 1634-1996. Density was measured on each test specimen were cut out of the central portion and the principal surfaces on the top surface and bottom surface sides. Table 7 shows the value of the central portion, the mean value of both principal surfaces, and the absolute value of the difference between the measured value on the central portion and the mean value of both principal surfaces.

Test specimens were cut out of the central portion and the principal surfaces on the top surface and bottom surface sides were subjected to lapping process on the surfaces thereof by using diamond abrasive having a mean particle size of 0.1 μm. Then the lapped surface was observed under a scanning electron microscope (SEM, 10,000 times) to count the number of pores. After measuring in three fields of view, each having area of 96.8 μm², the measured values were used to calculate the number of pores in an 900 μm², which is shown in Table 7.

The converted value was obtained for each of the test specimens cut out of the central portion and the principal surfaces on the top surface and bottom surface sides. Table 7 shows the value of the central portion, the mean value of both principal surfaces, and the absolute value of the difference between the measured value on the central portion and the mean value of both principal surfaces.

Machinability of the magnetic head was evaluated by measuring the lapping rate, under the same conditions as the polishing conditions of Example 6.

Volume specific resistance, heat conductivity and three-point bending strength were measured on the test specimen of each type of composition in accordance to JIS C 2141-1992, JIS R 1611-1997 and JIS R 1601-1995. The thickness was set to 3 mm for all test specimens used to measure three-point bending strength.

The results of the measurements are shown in Table 7.

TABLE 7

| No. | $Al_2O_3$ (% by weight) | TiC (% by weight) | Apparent density (g/cm³) | | | Number of pores (numbers/900 μm²) | | Difference |
| | | | ρ1 (Central portion) | ρ2 (Principal surfaces) | Difference $\Delta\rho = |\rho1 - \rho2|$ (g/cm³) | (Central portion) | (principal surfaces) | $\Delta c = |C1 - C2|$ (number/900 μm²) |
|---|---|---|---|---|---|---|---|---|
| 42 | 20 | 80 | — | — | — | — | — | — |
| 43 | 34 | 66 | 4.603 | 4.609 | 0.006 | 45 | 30 | 15 |
| 44 | 35 | 65 | 4.607 | 4.611 | 0.004 | 38 | 28 | 10 |
| 45 | 55 | 45 | 4.421 | 4.424 | 0.003 | 18 | 8 | 10 |
| 46 | 55 | 45 | 4.419 | 4.423 | 0.004 | 25 | 11 | 14 |
| 47 | 55 | 45 | 4.417 | 4.422 | 0.005 | 45 | 24 | 21 |
| 48 | 55 | 45 | 4.322 | 4.326 | 0.004 | 58 | 43 | 15 |
| 49 | 59 | 41 | 4.383 | 4.387 | 0.004 | 21 | 10 | 11 |
| 50 | 60 | 40 | 4.360 | 4.364 | 0.004 | 19 | 9 | 10 |
| 51 | 64 | 36 | 4.328 | 4.329 | 0.001 | 0 | 0 | 0 |
| 52 | 64 | 36 | 4.326 | 4.328 | 0.002 | 0 | 0 | 0 |
| 53 | 65 | 35 | 4.318 | 4.320 | 0.002 | 9 | 9 | 0 |

TABLE 7-continued

| | | | | | | | | |
|---|---|---|---|---|---|---|---|---|
| 54 | 66 | 34 | 4.318 | 4.321 | 0.003 | 9 | 8 | 1 |
| 55 | 70 | 30 | 4.273 | 4.275 | 0.002 | 0 | 0 | 0 |
| 56 | 71 | 29 | 4.269 | 4.274 | 0.005 | 32 | 3 | 29 |
| 57 | 85 | 15 | 4.142 | 4.148 | 0.006 | 28 | 6 | 22 |
| 58 | 64 | 36 | 4.323 | 4.330 | 0.007 | 37 | 3 | 34 |

| No. | Lapping arte (μm/hour) | Volume specific resistance (Ω·cm) | Heat conductivity (W/(m·K)) | Three-point bending strength (MPa) | Remarks |
|---|---|---|---|---|---|
| 42 | — | — | — | — | Poor sintering |
| 43 | 12 | $4.5 \times 10^{-4}$ | 17 | 600 | |
| 44 | 12 | $4.0 \times 10^{-4}$ | 18 | 700 | |
| 45 | 12 | $9.0 \times 10^{-4}$ | 18 | 890 | |
| 46 | 12 | $8.5 \times 10^{-4}$ | 18 | 860 | |
| 47 | 15 | $1.0 \times 10^{-3}$ | 18 | 690 | HIP was not performed |
| 48 | 12 | $8.0 \times 10^{-4}$ | 18 | 880 | |
| 49 | 13 | $1.2 \times 10^{-3}$ | 18 | 900 | |
| 50 | 13 | $1.0 \times 10^{-3}$ | 18 | 900 | |
| 51 | 14 | $2.0 \times 10^{-3}$ | 20 | 925 | |
| 52 | 14 | $2.0 \times 10^{-3}$ | 19 | 925 | HIP was not performed |
| 53 | 15 | $2.5 \times 10^{-3}$ | 21 | 925 | |
| 54 | 15 | $3.0 \times 10^{-3}$ | 21 | 930 | |
| 55 | 18 | $3.0 \times 10^{-3}$ | 22 | 940 | |
| 56 | 18 | $3.0 \times 10^{-2}$ | 23 | 950 | |
| 57 | 23 | $1.0 \times 10^{10}$ | 24 | 950 | |
| 58 | 15 | $2.0 \times 10^{-3}$ | 20 | 860 | |

As shown in Table 7, samples Nos. 44 to 46 and 48 to 55, that contained TiC in a range not less than 30% by weight nor more than 65% by weight, showed high electrical conductivity and high machinability. Also in samples Nos. 44 to 46 and 48 to 55, since the difference between the density at the principal surfaces and the density at the central portion was 0.004 g/cm³, difference between the number of pores at the principal surfaces and the number of pores at the central portion is 15, that is smaller than those in samples Nos. 47, 56 to 58 where the difference exceeded 0.004 g/cm³, and the lapping rate was also at satisfactory levels from 12 μm per hour to 18 μm per hour.

In samples Nos. 51 to 53 and 55, in particular, in which the difference between the density at the principal surfaces and the density at the central portion was not higher than 0.002 g/cm³ difference in the number of pores was zero, three-point bending strength was as high as 925 MPa or higher and heat conductivity was 19 W/(m·K) or higher.

The invention claimed is:

1. A ceramic sintered body comprising: $Al_2O_3$ crystal grains; internal TiC crystal grains existing in the $Al_2O_3$ crystal grains; and external TiC crystal grains other than the internal TiC crystal grains,
   wherein a content of TiC therein is not less than 36% by weight nor more than 50% by weight.

2. The ceramic sintered body according to claim 1, wherein most of the external TiC crystal grains exist in contact with the $Al_2O_3$ crystal grains.

3. The ceramic sintered body according to claim 1, wherein a proportion of an area of the external TiC crystal grains to an area of the total TiC crystal grains in sectional view is not less than 80% nor more than 99.7%.

4. The ceramic sintered body according to claim 1, wherein the mean crystal grain size of the $Al_2O_3$ crystal grains is 1.5 μm or less, and the mean crystal grain size of the external TiC crystal grains is 0.6 μm or less.

5. The ceramic sintered body according to claim 1, wherein a proportion of the mean crystal grain size of the external TiC crystal grains to the mean crystal grain size of the $Al_2O_3$ crystal grains is not less than 45% nor more than 95%.

6. The ceramic sintered body according to claim 1, which has heat conductivity of 21 W/(m·K) or higher.

7. The magnetic head substrate, which is made of the ceramic sintered body according to claim 1.

8. The magnetic head substrate according to claim 7, wherein a difference between a lattice constant of TiC at either principal surface and a lattice constant of TiC at the central portion in the direction of thickness is $1 \times 10^{-4}$ nm or less.

9. The magnetic head substrate according to claim 7, wherein a lattice constant of TiC at either principal surface and a lattice constant of TiC at the center in the direction of thickness of the magnetic head substrate are not less than 0.43150 nm nor more than 0.43168 nm.

10. The magnetic head substrate according to claim 7, wherein a content of $Al_2O_3$ is not less than 60% by weight nor more than 64% by weight, and a content of TiC is not less than 36% by weight nor more than 40% by weight.

11. The magnetic head substrate according to claim 7, which has a breakage strength of 700 MPa or higher.

12. The magnetic head substrate according to claim 8, wherein a difference between a density at either the principal surface and a density at the central portion in the direction of thickness of the magnetic head substrate is 0.004 g/cm³ or less.

13. The magnetic head substrate according to claim 7, wherein a density of the magnetic head substrate is 4.326 g/cm³ or higher.

14. The magnetic head, wherein an electromagnetic converter element is provided on each slider formed by dividing the magnetic head substrate according to claim 7 into chips.

15. The magnetic head according to claim 14, wherein the slider has a floating surface and a flow passage surface where air is allowed to flow, and arithmetic mean height (Ra) of the flow passage surface is 25 nm or less.

16. The recording medium drive unit, comprising: the magnetic head according to claim 15; a recording medium having a magnetic recording layer for recording and reproducing information by means of the magnetic head; and a motor for driving the recording medium.

* * * * *